United States Patent
Liu et al.

(10) Patent No.: US 10,750,560 B2
(45) Date of Patent: Aug. 18, 2020

(54) IOT DEVICE MANAGEMENT USING MULTI-PROTOCOL INFRASTRUCTURE NETWORK DEVICES

(71) Applicant: Extreme Networks, Inc., San Jose, CA (US)

(72) Inventors: Changming Liu, Cupertino, CA (US); Junjie Ma, San Jose, CA (US); Yufeng Wu, Milpitas, CA (US); Chris Scheers, Palo Alto, CA (US)

(73) Assignee: Extreme Networks, Inc., San Jose, CA (US)

( * ) Notice: Subject to any disclaimer, the term of this patent is extended or adjusted under 35 U.S.C. 154(b) by 11 days.

(21) Appl. No.: 15/277,133

(22) Filed: Sep. 27, 2016

(65) Prior Publication Data

US 2018/0092151 A1    Mar. 29, 2018

(51) Int. Cl.
| | |
|---|---|
| *H04W 76/18* | (2018.01) |
| *H04L 29/08* | (2006.01) |
| *H04W 4/70* | (2018.01) |
| *H04W 24/02* | (2009.01) |
| *H04W 84/12* | (2009.01) |
| *H04W 88/08* | (2009.01) |

(52) U.S. Cl.
CPC ............ *H04W 76/18* (2018.02); *H04L 67/10* (2013.01); *H04W 4/70* (2018.02); *H04W 24/02* (2013.01); *H04W 84/12* (2013.01); *H04W 88/08* (2013.01)

(58) Field of Classification Search
CPC ... H04W 76/18; H04W 72/04; H04W 76/027; H04W 4/70; H04W 24/02; H04W 84/12; H04W 88/08; H04L 67/10
See application file for complete search history.

(56) References Cited

U.S. PATENT DOCUMENTS

| | | | |
|---|---|---|---|
| 7,411,911 B2* | 8/2008 | Huotari | H04L 41/082 370/236 |
| 9,860,677 B1 | 1/2018 | Agerstam | |
| 9,954,953 B2 | 4/2018 | Baughman | |
| 2003/0060973 A1* | 3/2003 | Mathews | G01C 21/26 701/410 |
| 2012/0240185 A1* | 9/2012 | Kapoor | H04L 63/1425 726/1 |
| 2014/0317359 A1* | 10/2014 | Naik | G06F 17/30115 711/142 |

(Continued)

FOREIGN PATENT DOCUMENTS

WO     2016085456    6/2016

OTHER PUBLICATIONS

International Application No. PCT/US2018/017278, International Search Report and Written Opinion dated Apr. 17, 2018.

*Primary Examiner* — Christopher M Crutchfield
*Assistant Examiner* — Tito Q Pham
(74) *Attorney, Agent, or Firm* — Sterne, Kessler, Goldstein & Fox P.L.L.C.

(57) ABSTRACT

Techniques for managing IoT devices through multi-protocol infrastructure network devices are disclosed. A system utilizing such techniques can include a multi-protocol infrastructure network device and a WAN based IoT device management system and various network device based engines. A method utilizing such techniques can include management according to WAN based IoT device policies and LAN based IoT device policies.

20 Claims, 10 Drawing Sheets

(56) References Cited

U.S. PATENT DOCUMENTS

| | | | |
|---|---|---|---|
| 2015/0310195 A1* | 10/2015 | Bailor | G06F 21/316 |
| | | | 726/6 |
| 2015/0324568 A1 | 11/2015 | Publicover | |
| 2016/0127073 A1 | 5/2016 | Ashrafi | |
| 2016/0142868 A1 | 5/2016 | Kulkarni | |
| 2016/0182639 A1 | 6/2016 | Hong | |
| 2016/0357524 A1 | 12/2016 | Maluf | |
| 2016/0359672 A1* | 12/2016 | Blair | H04L 41/0893 |
| 2017/0005820 A1* | 1/2017 | Zimmerman | H04L 67/10 |
| 2017/0126262 A1* | 5/2017 | Zakaria | H04B 1/1036 |
| 2017/0171747 A1* | 6/2017 | Britt | H04W 12/04 |
| 2017/0171778 A1* | 6/2017 | Britt | H04W 28/10 |
| 2017/0302704 A1* | 10/2017 | Ellis | H04L 63/20 |
| 2017/0351505 A1* | 12/2017 | Riedl | G06F 8/65 |
| 2018/0053391 A1* | 2/2018 | Britt | G08B 21/0288 |
| 2018/0063851 A1* | 3/2018 | Abraham | H04W 72/10 |
| 2018/0069933 A1* | 3/2018 | Chandra | H04L 12/66 |

\* cited by examiner

IOT DEVICE MANAGEMENT USING MULTI-PROTOCOL INFRASTRUCTURE NETWORK DEVICES

BACKGROUND

Internet of Things ("IoT") device management is an area of ongoing research and development. Limitations of IoT device management include protocol limitations, limited network durations, ad hoc networking limitations, bandwidth inefficiency, multi-hop transmissions through wireless nodes, and connectivity requirements for management of IoT devices. Ameliorating or eliminating one or more of these problems would likely be considered a desirable improvement over the state of the art.

DETAILED DESCRIPTION

Figure 1:
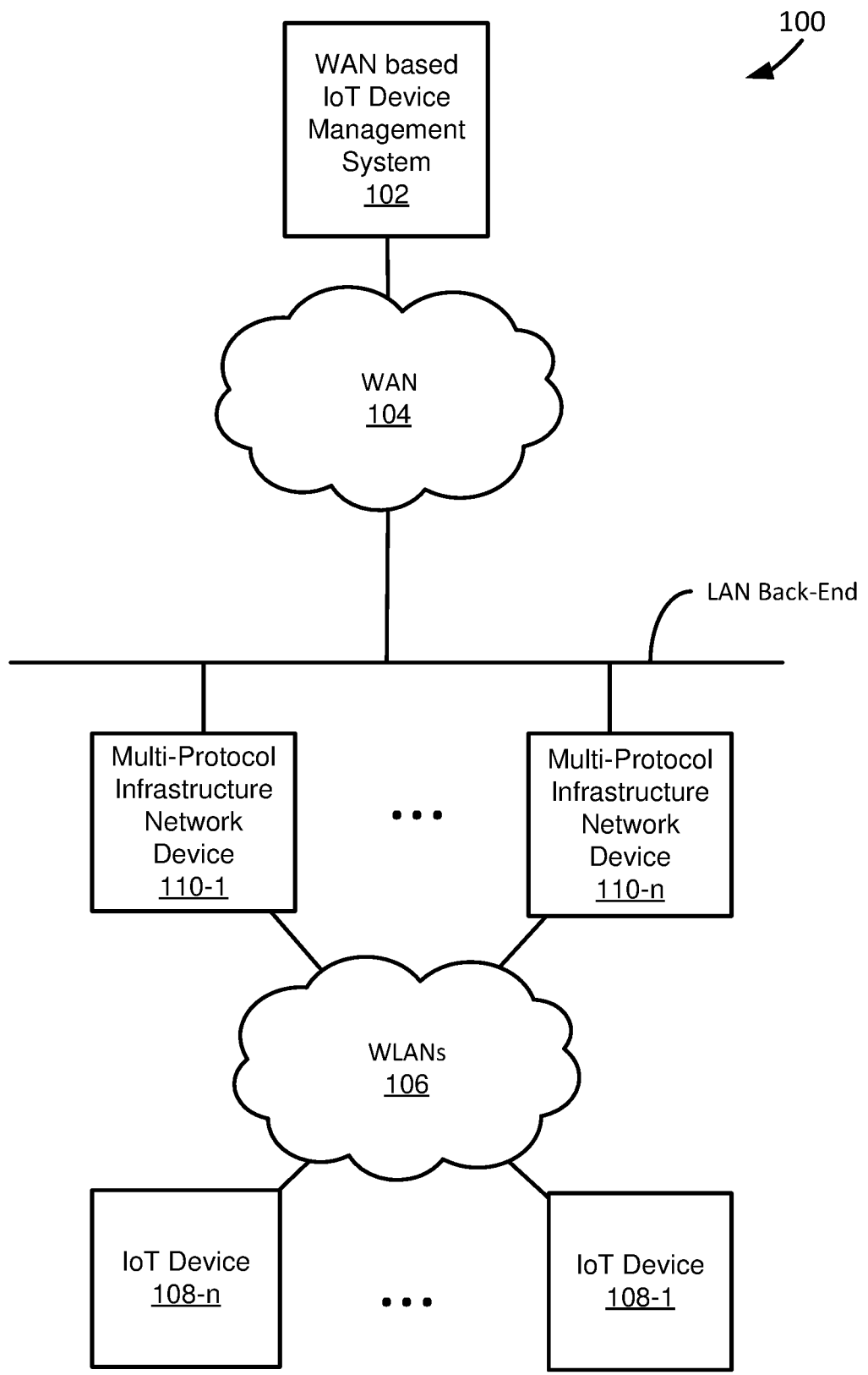
FIG. 1 depicts a diagram of an example of a system for managing Internet of Things devices through wireless local area networks using local multi-protocol infrastructure network devices.

FIG. 1 depicts a diagram 100 of an example of a system for managing Internet of Things devices (hereinafter referred to as "IoT devices") through wireless local area networks (hereinafter referred to as "WLANs") using local multi-protocol infrastructure network devices. The diagram 100 includes a wide area network (hereinafter referred to as "WAN") based IoT device management system 102, a WAN 104 coupled to the WAN based IoT device management system 102, WLANs 106, IoT device 108-1 . . . IoT device 108-$n$ (hereinafter referred to as "IoT devices 108") coupled to the WLANs 106, and multi-protocol infrastructure network device 110-1 . . . multi-protocol infrastructure network device 110-$n$ (hereinafter referred to as "multi-protocol infrastructure network devices 110") coupled to the WLANs 106. "WAN based" is intended to indicate the WAN based IoT device management system 102 is accessible through the WAN 104. A local area network (hereinafter referred to as "LAN") back-end, which, depending upon the implementation, can include either or both a wired or wireless back-end, couples the WAN 104 to the multi-protocol infrastructure network devices 110. Additionally, in the example system shown in FIG. 1, the IoT devices 108 are operationally coupled to the multi-protocol infrastructure network devices 110 through the WLANs 106.

In the example of FIG. 1, the WAN 104 and WLANs 106 are intended to represent networks that include or are included in a computer-readable medium. A computer-readable medium, as discussed in this paper, is intended to represent a variety of potentially applicable technologies. For example, a computer-readable medium can be used to form a network or part of a network. Where two components are co-located on a device, a computer-readable medium can include a bus or other data conduit or plane. Where a first component is co-located on one device and a second component is located on a different device, a computer-readable medium can include a wireless or wired back-end network, LAN, or WLAN. A computer-readable medium can also encompass a relevant portion of a WAN or other network, if applicable.

Assuming a computer-readable medium includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (hereinafter referred to as "HTTP") for hypertext markup language (hereinafter referred to as "HTML") documents that make up the World Wide Web (hereinafter referred to as "the web"). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

A computer-readable medium and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

A computer-readable medium and other applicable systems or devices described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. As used in this paper, edge devices include applicable devices at an edge of one or a combination of a LAN, a WLAN, a consumer network, and an enterprise network. For example, an edge device can be a networking device, at an edge of a LAN, providing wireless access to network services through a WLAN. In another example, an edge device can be an IoT device accessing network services through a WLAN. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors, at least partially implemented in hardware, or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include software embodied in a computer-readable medium, firmware, or hardware for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Referring once again to the example of FIG. 1, the WAN based IoT device management system 102 is intended to represent a system that remotely manages IoT devices accessing network services through WLANs. Functions performed remotely and data generated as a result of functions performed remotely, as used in this paper, can be referred to as WAN based functions performed outside of a LAN and WAN based data generated outside of a LAN. For example, an IoT policy generated remotely from a LAN can be referred to as a WAN based IoT policy. In remotely managing IoT devices, the WAN based IoT device management system 102 can manage IoT devices using an applicable device forming an applicable node in an enterprise or consumer network. For example, the WAN based IoT device management system 102 can remotely control the transmission of data to and from IoT devices through WLANs using network devices in the LAN back-end, as part of managing IoT devices. In another example, the WAN based IoT device management system can remotely control the flow of data through WLANs using multi-protocol infrastructure network devices providing IoT devices wireless access to network services through the WLANs.

In a specific implementation, the WAN based IoT device management system 102 functions to manage IoT devices according to an IoT policy. An IoT policy is indicated by IoT policy data and includes applicable rules for transmitting data to and from IoT devices, e.g. systems and devices an IoT device can communicate with, data an IoT device can send and receive, and specific user access rights in utilizing or configuring IoT devices. In managing IoT devices according to an IoT device policy, the WAN based IoT device management system 102 can remotely control communication of data to and from IoT devices using multi-protocol infrastructure network devices wirelessly connected to the IoT devices through WLANs. For example, if an IoT policy indicates an IoT device is not allowed to communicate with a source on the Internet, then the WAN based IoT device management system 102 can block an exchange of data between the IoT device and the source on the Internet using a multi-protocol infrastructure network device coupled to the IoT device through a WLAN. In another example, if an IoT policy indicates a first IoT device is not allowed to communicate with a second IoT device, then the WAN based IoT device management system 102 can block an exchange of data between the first and second IoT devices through multi-protocol infrastructure network devices coupled to the IoT devices through WLANs. Further in the example, the first IoT device can be coupled to a multi-protocol infrastructure network device within a first infrastructure, e.g. a first building, and the second IoT device can be coupled to a multi-protocol infrastructure network device within a second different infrastructure, e.g. a second building, and the WAN based IoT device management system 102 can block an exchange of data between the first and second IoT devices through the WAN 104.

In a specific implementation, as part of IoT device management, the WAN based IoT device management system 102 functions to control IoT devices remotely using multi-protocol infrastructure network devices coupled to the IoT devices through WLANs. Controlling IoT devices, as used in this paper, includes instructing or causing an IoT device to perform a function. For example, controlling an IoT device can include instructing the IoT device to shut off. The WAN based IoT device management system 102 can control an IoT device according to an IoT policy. For example, if an IoT policy specifies to turn off lights in an office at ten in the evening, then at ten in the evening the WAN based IoT device management system 102 can instruct the lights in the office to turn off at ten in the evening. Additionally, the WAN based IoT device management system 102 can control an IoT device according to instructions from a user. For example, if a user checks a status of the lights in their office, e.g. by viewing published IoT device data, and instructs to turn the lights off, then the WAN based IoT device management system 102 can instruct the lights to shut off according to the instructions received from the user.

In a specific implementation, the WAN based IoT device management system 102 functions to maintain an IoT policy for use in managing IoT devices through WLANs using local multi-protocol infrastructure network devices. As part of maintaining an IoT policy, the WAN based IoT device management system 102 can generate and/or update the policy. In maintaining an IoT policy for use in managing IoT devices, the WAN based IoT device management system 102 can maintain an IoT policy in accordance with traffic pattern records of IoT devices in accessing network services of an enterprise or consumer network. The WAN based IoT device management system 102 can maintain an IoT policy according to traffic pattern records of one or a combination of any IoT devices in one or a plurality of enterprise or consumer network. For example, the WAN based IoT device management system 102 can maintain an IoT policy according to traffic pattern records of IoT devices accessing network services through different enterprise or consumer networks. In another example, the WAN based IoT device management system 102 can maintain an IoT policy according to traffic pattern records of IoT devices accessing network services through different LANs of an enterprise or consumer network. In yet another example, the WAN based IoT device management system 102 can maintain an IoT policy according to traffic pattern records of IoT devices accessing network services through different WLANs as part of a LAN. In another example, the WAN based IoT device management system 102 can maintain an IoT policy according to traffic pattern records of IoT devices accessing network services through the same WLAN.

In a specific implementation, the WAN based IoT device management system 102 functions to maintain traffic pattern records of data sent to and from IoT devices accessing network services through multi-protocol infrastructure network devices using WLANs. Traffic pattern records can be included as part of traffic pattern data. Traffic pattern records include applicable data related to data sent to and from IoT devices in accessing network services, e.g. sources, systems, and devices IoT devices communicate with, types of data sent to and from IoT devices, device types of IoT devices accessing network services, times at which IoT devices access specific network services, and users who utilize, access, configure, or otherwise control IoT devices. The WAN based IoT device management system 102 can maintain traffic pattern records for one or a combination of IoT devices accessing network services through different enterprise or consumer networks, IoT devices accessing network services through different LANs of an enterprise or consumer network, IoT devices accessing network services through different WLANs, and IoT devices accessing network services through the same WLAN.

In a specific implementation, the WAN based IoT device management system 102 functions to maintain traffic pattern records for IoT devices based on data flow through an applicable device forming an applicable node within an enterprise or consumer network. For example, the WAN based IoT device management system 102 can maintain traffic pattern records for IoT devices based on data flow through multi-protocol infrastructure network devices providing wireless network service access to IoT devices through WLANs. In another example, the WAN based IoT device management system 102 can maintain traffic pattern records for IoT devices based on data flow through network devices of the LAN back-end. Traffic pattern records maintained by the WAN based IoT device management system 102 can be used to maintain an IoT policy for managing IoT devices through WLANs wirelessly coupling the IoT devices to multi-protocol infrastructure network devices for network service access.

In a specific implementation, as part of IoT device management, the WAN based IoT device management system 102 functions to receive packet inspection data. Packet inspection data includes applicable data generated by analyzing packets of data sent to and from IoT devices. For example, packet inspection data can include what data is included in a data packet, the actual data included in a packet, a sender of a data packet, and a destination of a data packet. Packet inspection data received by the WAN based IoT device management system 102 can be generated according to an applicable technique for analyzing data packets. For example, packet inspection data can be generated through packet header analysis and/or deep packet inspection. The WAN based IoT device management system 102 can receive packet inspection data from an applicable network device forming an applicable node within an enterprise or consumer network. For example, the WAN based IoT device management system 102 can receive packet inspection data from network devices in LAN back-end and/or edge devices providing IoT devices wireless network service access through a WLAN. The WAN based IoT device management system 102 can use received packet inspection data to maintain traffic pattern records for managing an IoT policy. Additionally, the WAN based IoT device management system 102 can use received packet inspection data to control the flow of data to and from IoT devices as part of remote IoT device management, according to an IoT policy.

In a specific implementation, the WAN based IoT device management system 102 functions to synchronize multi-protocol infrastructure network devices to locally manage IoT devices through WLANs coupling the IoT devices to the multi-protocol infrastructure network devices. Functions performed locally and data generated as a result of functions performed locally, as used in this paper, can be referred to as LAN based functions performed specifically within a LAN and LAN based data generated specifically within a LAN. For example LAN data can include IoT policy data specific across a LAN or specific within certain network devices in a LAN. In synchronizing multi-protocol infrastructure network devices to manage IoT devices through WLANs coupling the IoT devices to multi-protocol infrastructure network devices, the WAN based IoT device management system 102 can provide an IoT policy to the multi-protocol infrastructure network devices for use by the multi-protocol infrastructure network devices to locally manage IoT devices. For example, the WAN based IoT device management system 102 can provide an IoT policy to the multi-protocol infrastructure network devices which can be used by the multi-protocol infrastructure network devices to locally control network service access of IoT devices, e.g. the sending and receiving of data to and from the IoT devices, coupled to the multi-protocol infrastructure network devices through WLANs.

In a specific implementation, as part of IoT device management, the WAN based IoT device management system 102 functions to detect irregular IoT device behavior. The WAN based IoT device management system 102 can detect irregular IoT device behavior according to traffic pattern records of IoT devices in accessing network services through WLANs coupling the IoT devices to multi-protocol infrastructure network devices. For example, the WAN based IoT device management system 102 can compare historical traffic pattern records of IoT devices in accessing network services to current traffic pattern records of the IoT devices to determine if the IoT devices are acting differently, hence irregularly, according to their traffic pattern records. As part of IoT device management, the WAN based IoT device management system 102 can update IoT policies based on detection of irregular IoT device behavior. For example, if an IoT device is acting irregularly by communicating with another IoT device it usually does not communicate with, e.g. through a multi-protocol infrastructure network device coupled to the IoT device through a WLAN, then the WAN based IoT device management system 102 can update an IoT policy to indicate blocking communications between the IoT devices.

In a specific implementation, the WAN based IoT device management system 102 functions to maintain and/or publish IoT device data for cloud based access by users. IoT device data can include IoT traffic pattern data describing traffic pattern records for IoT devices, detection of irregular IoT device behavior including how IoT devices are behaving irregularly, IoT policies used in managing IoT devices, and statuses of IoT devices. For example, the WAN based IoT device management system 102 can publish IoT device data indicating the lights are on in a user's office. The WAN based IoT device management system 102 can publish IoT device data based on data received from one or a combination of edge devices of a LAN. For example, WAN based IoT device management system 102 can publish IoT device data based on data received from a multi-protocol infrastructure network device providing an IoT devices access to network services through WLANs. Further, the WAN based IoT device management system 102 can publish IoT device data based on traffic pattern data of an IoT device in accessing network services through a WLAN using a multi-protocol infrastructure network device.

In a specific implementation, the WAN based IoT device management system 102 functions to publish IoT device data for cloud based access by users using MQ Telemetry Transport (hereinafter referred to as "MQTT"). In publishing IoT device data using MQTT, the WAN based IoT device management system 102 can function as an MQTT client who sends IoT device data to an MQTT broker who hosts and publishes the IoT device data in the cloud. The WAN based IoT device management system 102 can instruct an MQTT broker, e.g. by including instructions as part of IoT device data, specific users to allow access to specific IoT device data. For example, the WAN based IoT device management system 102 can instruct an MQTT broker to only distribute to a user IoT device data of devices owned by the user.

In a specific implementation, the WAN based IoT device management system 102 functions to assign a multi-protocol infrastructure network device to coordinate establishment and maintenance of a WLAN, over which an IoT device can access network services. In assigning a multi-protocol infrastructure network device to coordinate establishment and maintenance of a WLAN, the WAN based IoT device management system 102 can provide instructions to the multi-protocol infrastructure network device for establishing and maintaining the WLAN. For example, the WAN based IoT device management system 102 can assign a multi-protocol infrastructure network device to act as a ZigBee® coordinator. Further in the example, the multi-protocol infrastructure network device can set up other multi-protocol infrastructure network devices within the same LAN as the multi-protocol infrastructure network device to act as ZigBee® routers in forming a ZigBee® WLAN.

In the example of FIG. 1, the WLANs 106 are intended to represent networks that provide wireless communication channels through which IoT devices can wirelessly access network services of an enterprise or consumer network. The WLANs 106 can be established and maintained according to applicable wireless communication protocols or standards, e.g. Wi-Fi, ZigBee®, Bluetooth®, applicable low-power communication standards, or applicable wireless personal area network (hereinafter referred to as "PAN") communication standards. Additionally, the WLANs 106 can be comprised of multiple WLANs established and maintained according to different applicable wireless communication protocols simultaneously. For example the WLANs 106 can include a ZigBee® based WLAN maintained simultaneously with a Wi-Fi based WLAN.

In the example of FIG. 1, the IoT devices 108 are intended to represent devices that function to access network services of an enterprise or consumer network through the WLANs 106. In accessing network services, the IoT devices 108 can use the WLANs 106 to wirelessly send and receive data. Depending upon implementation-specific or other considerations, the IoT devices 108 can use the WLANs 106 to communicate with other IoT devices or sources or systems through the WAN 104. The IoT devices 108 include wired and/or wireless interfaces through which the IoT devices 108 can send and receive data over wired and/or wireless connections. Examples of IoT devices include thermostats, mobile devices, biological managers, sensory devices, and functionality performing devices. In sending and receiving data over a wireless connection, the IoT devices 108 can communicate according to an applicable wireless communication protocol or standard, e.g. Wi-Fi, ZigBee®, Bluetooth®, Z-Wave®, applicable low-power communication standards, or applicable wireless PAN communication standards. For example, the IoT devices 108 can send and receive data over a ZigBee® WLAN defined by IEEE 802.15-4, which is hereby incorporated by reference. The IoT devices 108 can include unique identifiers which can be used to facilitate network service access by the IoT devices 108.

In a specific implementation, the IoT devices 108 act as or include stations, by including a wireless interface through which the IoT devices 108 can be coupled through Wi-Fi connections to a multi-protocol infrastructure network device. A station, as used in this paper, can be referred to as a device with a media access control (MAC) address and a physical layer (PHY) interface to a wireless medium that complies with the IEEE 802.11 standard. Thus, for example, the wireless devices 104 can be referred to as a station, if applicable. IEEE 802.11a-1999, IEEE 802.11b-1999, IEEE 802.11g-2003, IEEE 802.11-2007, IEEE 802.11n TGn Draft 8.0 (2009), and IEEE 802.11ac-2013 are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative implementations, a station may comply with a different standard than Wi-Fi or IEEE 802.11, may be referred to as something other than a "station," and may have different interfaces to a wireless or other medium.

IEEE 802.3 is a working group and a collection of IEEE standards produced by the working group defining the physical layer and data link layer's MAC of wired Ethernet. This is generally a LAN technology with some wide area network applications. Physical connections are typically made between nodes and/or network devices, e.g. infrastructure network devices (hubs, switches, routers), by various types of copper or fiber cable. IEEE 802.3 is a technology that supports the IEEE 802.1 network architecture. As is well-known in the relevant art, IEEE 802.11 is a working group and collection of standards for implementing WLAN computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the IoT devices 108 function to only send data. In only sending data, the IoT devices 108 can function to not access network services provided through WLANs using multi-protocol infrastructure network device. For example, the IoT devices 108 can include beacons configured to transmit beacon signals.

In the example of FIG. 1, the multi-protocol infrastructure network devices 110 are intended to represent devices that send and receive data in providing IoT devices network service access through WLANs. The multi-protocol infrastructure network devices 110 and other network devices described in this paper can include or function as routers, switches, access points, gateways, including wireless gateways, repeaters, or a combination thereof. In functioning as gateways, the multi-protocol infrastructure network devices 110 can transmit and receive data between the WAN 104 through the LAN back-end and IoT devices coupled to the multi-protocol infrastructure network devices 110. In functioning as access points, the multi-protocol infrastructure network devices 110 can couple an IoT device to network device forming the LAN back-end and the WAN 104 through the WLANs 106. For example, the multi-protocol infrastructure network devices 110 can be used to route data between IoT devices coupled to the multi-protocol infrastructure network devices 110 as part of a PAN formed, at least in part, by the IoT devices and the multi-protocol infrastructure network devices 110. In various implementations, the multi-protocol infrastructure network devices 110 function according to applicable wireless communication protocols or standards, e.g. Wi-Fi, ZigBee®, Bluetooth®, applicable low-power communication standards, or applicable wireless PAN communication standards.

The multi-protocol infrastructure network devices 110 are intended to represent infrastructure network devices capable of providing IoT devices access to network services through wireless connections established and maintained according to different wireless protocols, thereby forming different WLANs. For example, the multi-protocol infrastructure network devices 110 can provide network services access to a first IoT device through a Bluetooth® connection and provide network service access to a second IoT device through a Wi-Fi connection. Additionally, the multi-protocol infrastructure network devices 110 can simultaneously provide multiple IoT devices access to network services of a network over different wireless connections established according to different wireless protocols. For example, the multi-protocol infrastructure network devices 110 can provide network service access to a first IoT device through a Bluetooth® connection and simultaneously provide network service access to a second IoT device through a Wi-Fi connection.

A multi-protocol infrastructure network device capable of allowing IoT devices to access network services through different WLANs established according to different protocols, enables IoT devices configured to access network services through the different WLANs to communicate with each other over the different WLANs. For example, a first IoT device can send data to a unique multi-protocol infrastructure network device through a Bluetooth® based WLAN, and the same or a different unique multi-protocol infrastructure network device can send the data to a second IoT device through a ZigBee® based WLAN. As a result, the first and second IoT devices can communicate with each other even though the first IoT device is configured to access network services through a Bluetooth® based WLAN and the second IoT device is configured to access network services through a ZigBee® based WLAN. Data can be translated or transformed for transmission according to a different protocol, e.g. from a WiFi connected device to a ZigBee® connected device, at an applicable network device with a LAN, e.g. at the multi-protocol infrastructure network devices 110, or an applicable system for remotely managing IoT devices, e.g. the WAN based IoT device management systems described in this paper.

The multi-protocol infrastructure network devices 110 function as infrastructure devices by being formed as part of a local network infrastructure for providing network service access through WLANs. For example, the multi-protocol infrastructure network devices 110 can be edge devices of a LAN network infrastructure and used to form, at least in part, a Wi-Fi network. In another example, the multi-protocol infrastructure network devices 110 can be edge devices of a LAN network infrastructure and used to form, at least in part, a ZigBee® network.

In a specific implementation, the multi-protocol infrastructure network devices 110 include protocol-compatible or protocol-specific hardware used in establishing and maintaining a WLAN according to a specific protocol. For example, the multi-protocol infrastructure network devices 110 can include ZigBee® interfaces configured to allow the multi-protocol infrastructure network devices 110 to establish and maintain ZigBee® based WLANs. Further in the example, the multi-protocol infrastructure network devices 110 can include ZigBee® interfaces included as part of removable dongles coupled to the multi-protocol infrastructure network devices 110 or included as part of fixed hardware integrated into the multi-protocol infrastructure network devices 110.

In a specific implementation, the multi-protocol infrastructure network devices 110 function as direct portals to the LAN back-end. In functioning as direct portals to the LAN back-end the multi-protocol infrastructure network devices 110 are directly connected to a network switch, e.g. a router or a bridge, of the LAN back-end. The multi-protocol infrastructure network devices 110 can each be directly connected to corresponding individual network switches of a LAN back-end or a plurality of the multi-protocol infrastructure network devices 110 can be directly connected to a single network switch of the LAN back-end.

In serving as direct portals to the LAN back-end, the multi-protocol infrastructure network devices 110 can provide direct access to network services of a network, without having to exchange data with other devices at the edge of a LAN, e.g. other multi-protocol infrastructure network devices 110 or IoT devices. For example, if an IoT device is coupled to a multi-protocol infrastructure network device through a ZigBee® connection as part of a ZigBee® network, data can be exchanged between the IoT device and the LAN back-end using the multi-protocol infrastructure network device without having to exchange the data with another multi-protocol infrastructure network device or IoT device forming a node as part of the ZigBee® network. By providing direct access to the LAN backend, without exchanging data from other edge devices, power consumption levels of the other edge devices can be reduced and/or network traffic on the other edge devices can be reduced leading to increased network throughput.

In a specific implementation, the multi-protocol infrastructure network devices 110 function to locally manage IoT devices according to an IoT policy. In locally managing IoT devices according to an IoT policy, the multi-protocol infrastructure network devices 110 can control the flow of data to and from IoT devices over WLANs coupling the IoT devices to the multi-protocol infrastructure network devices 110. For example, if an IoT policy indicates an IoT device is not allowed to communicate with a source on the Internet, then the multi-protocol infrastructure network devices 110 can block the exchange of data between the IoT device and the source on the Internet over a WLAN wirelessly connecting the IoT device to the multi-protocol infrastructure network devices 110. In another example, if an IoT policy indicates a first IoT device is not allowed to communicate with a second IoT device, then the multi-protocol infrastructure network devices 110 can locally block an exchange of data between the first and second IoT devices over WLANs wirelessly connecting the multi-protocol infrastructure network devices 110 and the IoT devices.

In a specific implementation, the multi-protocol infrastructure network devices 110 functions to locally manage IoT devices using IoT policy data residing locally at the multi-protocol infrastructure network devices 110. IoT policy data residing locally at the multi-protocol infrastructure network devices 110 can be provided from an applicable remote system for managing IoT devices, such as the WAN based IoT device management systems described in this paper. For example, IoT policy data can be created remotely based on traffic pattern records of IoT devices in different enterprise or consumer networks and provided to the multi-protocol infrastructure network devices 110 for use in locally managing IoT devices by the multi-protocol infrastructure network devices 110.

In a specific implementation, the multi-protocol infrastructure network devices 110 function to locally maintain an IoT policy for use in locally managing IoT devices. As part of locally maintaining an IoT policy, the multi-protocol infrastructure network devices 110 can generate and/or update locally stored IoT policy data. In locally maintaining an IoT policy for use in managing IoT devices, the multi-protocol infrastructure network devices 110 can maintain an IoT policy in accordance with traffic pattern records of IoT devices in accessing network services. A multi-protocol infrastructure network device can maintain an IoT policy according to traffic pattern records of IoT devices wirelessly connected to the multi-protocol infrastructure network device through one or a plurality of WLANs. For example a multi-protocol infrastructure network device can maintain an IoT policy according to traffic pattern records of IoT devices wireless connected to the multi-protocol infrastructure network device through ZigBee® connections, as part of a ZigBee® WLAN formed using the multi-protocol infrastructure network device. The multi-protocol infrastructure network devices 110 can maintain traffic pattern records of IoT devices according to traffic pattern records of data sent to and from the IoT devices and use the traffic pattern records to locally maintain an IoT policy. For example, if a traffic pattern record indicates a first IoT device communicates with a second IoT device through the multi-protocol infrastructure network devices 110 using WLANs, then the multi-protocol infrastructure network devices 110 can update locally stored IoT policy to allow for exchange of data between the first and second IoT devices.

In a specific implementation, as part of local IoT device management, the multi-protocol infrastructure network devices 110 functions to locally inspect data packets sent to and from IoT devices to generate packet inspection data. The multi-protocol infrastructure network devices 110 can use an applicable packet inspection technique to inspect data packets sent to and from IoT devices. For example, the multi-protocol infrastructure network devices 110 can locally perform deep packet inspection on the data packets. In locally inspecting data packets sent to and from IoT devices over WLANs, the multi-protocol infrastructure network devices 110 can locally maintain traffic patterns records for the IoT devices. For example, if through deep packet inspection, the multi-protocol infrastructure network devices 110 determines an IoT device is sending specific instructions to another IoT device, then the multi-protocol infrastructure network devices 110 can locally update a traffic pattern record to indicate the IoT device is sending the specific instructions to IoT devices. Additionally, in inspecting data packets sent to and from IoT devices, the multi-protocol infrastructure network devices 110 can locally control the flow of data to and from IoT devices over WLANs according to an IoT policy. For example, if the multi-protocol infrastructure network devices 110, through local packet inspection, determines an IoT device is communicating with a system it is prohibited from communicating with, according to an IoT policy, then the multi-protocol infrastructure network devices 110 can block the communication between the system and the IoT device by not routing or transmitting data packets sent from the system to the IoT device and vice versa.

In a specific implementation, the multi-protocol infrastructure network devices 110 function to use the LAN back-end in locally managing IoT devices through WLANs. Specifically, the multi-protocol infrastructure network devices 110 can use the LAN back-end to exchange data between IoT devices according to an IoT policy. The multi-protocol infrastructure network devices 110 can use the LAN back-end to manage IoT device to manage IoT devices when the WAN 104 fails. For example, the multi-protocol infrastructure network devices 110 can use the LAN back-end to exchange data, according to an IoT policy, between IoT devices through WLANs when the WAN 104 fails and the multi-protocol infrastructure network devices 110 are not connected to the Internet. In locally managing IoT devices according to an IoT policy when the WAN 104 fails, risks of corruption or hacking of the IoT devices is reduced as the IoT policy can still be enforced in the event of the WAN 104 failing. Additionally, in using the LAN back-end in locally managing IoT devices according to an IoT policy, the multi-protocol infrastructure network devices 110 can control an IoT device when a user is on premises and/or couples to a local LAN without using the WAN 104. For example, a user can come on premises and wirelessly connect their client device to the multi-protocol infrastructure network devices 110 to control an IoT device coupled to the multi-protocol infrastructure network devices 110 only using the LAN without the WAN 104.

In a specific implementation, the multi-protocol infrastructure network devices 110 are directly interconnected edge devices of a LAN. Directly interconnected edge devices are edge devices that are directly connected to each other independently from couplings provided through the LAN back-end. Specifically, the multi-protocol infrastructure network devices 110 can be coupled to each other through wireless connections along the edge of the LAN and outside of the LAN back-end. The multi-protocol infrastructure network devices 110 can exchange data directly between each other, without the use of the LAN back-end, through wireless connections formed between the multi-protocol infrastructure network devices 110. In being directly interconnected edge devices, the multi-protocol infrastructure network devices 110 can communicate with each other when the LAN back-end and/or the WAN 104 fails. The multi-protocol infrastructure network devices 110 can use connections directly interconnecting the multi-protocol infrastructure network devices 110 to locally manage IoT devices through WLANs. For example, in being directly interconnected edge devices, the multi-protocol infrastructure network devices 110 can locally exchange data between IoT devices, as part of enforcing an IoT policy, when the WAN 104 fails and Internet access is disrupted using, at least in part, wireless connections directly connecting the multi-protocol infrastructure network devices 110 together independently from the LAN back-end.

In a specific implementation, as part of IoT device management, the multi-protocol infrastructure network devices 110 function to locally control IoT devices through WLANs. The multi-protocol infrastructure network devices 110 can control an IoT device according to an IoT policy. For example an IoT policy can specify to shut off lights in an office at a specific time, and the multi-protocol infrastructure network devices 110 can instruct the lights in the office to shut off according to the IoT policy using WLANs. Additionally, the multi-protocol infrastructure network devices 110 can control an IoT device according to instructions from a user. For example, if a user checks a status of the lights in their office, e.g. by viewing published IoT device data, and instructs to turn the lights off, through the LAN, then the multi-protocol infrastructure network devices 110 can instruct the lights to shut off according to the instructions received from the user.

In a specific implementation, as part of IoT device management, the multi-protocol infrastructure network devices 110 functions to locally detect irregular IoT device behavior of IoT devices. The multi-protocol infrastructure network devices 110 can detect irregular IoT device behavior according to traffic pattern records of IoT devices in accessing network services through WLANs coupling the IoT devices to the multi-protocol infrastructure network devices 110. For example, the multi-protocol infrastructure network devices 110 can compare historical traffic pattern records of IoT devices of accessing network services to current traffic pattern records of the IoT devices to determine if the IoT devices are acting differently, hence irregularly, according to their traffic pattern records. As part of IoT device management, the multi-protocol infrastructure network devices 110 can locally update IoT policies based on detection of irregular IoT device behavior. For example, if an IoT device is acting irregularly by communicating with another IoT device it usually does not communicate with, then the multi-protocol infrastructure network devices 110 can update an IoT policy to indicate blocking communication between the IoT devices.

In a specific implementation, the multi-protocol infrastructure network devices 110 function to always be powered on for use in managing or facilitating management of IoT devices. In always being powered on, the need to power on a device for providing an IoT device access to network services of a network is eliminated, thereby allowing faster and easier IoT device integration and management. For example, a user can couple their client device to one of the multi-protocol infrastructure network devices 110 without having to wait for the multi-protocol infrastructure network devices 110 to power on, thereby allowing the user to quickly control IoT devices coupled to the multi-protocol infrastructure network devices 110.

In a specific implementation, the multi-protocol infrastructure network devices 110 functions to locally maintain IoT device data. The multi-protocol infrastructure network devices 110 can provide IoT device data for publication to allow cloud based access by users. For example, the multi-protocol infrastructure network devices 110 can provide IoT device data to an applicable cloud based management system, such as the WAN based IoT device management systems described in this paper, for subsequent publication of the IoT device data. In another example, the multi-protocol infrastructure network devices 110 can act as a MQTT client and provide IoT device data to a MQTT broker who hosts and publishes the IoT device data in the cloud. Additionally, the multi-protocol infrastructure network devices 110 can allow users local access to IoT device data. For example, a user can connect to a multi-protocol infrastructure network device through a LAN and access locally stored IoT device data to determine the status of IoT devices coupled to the LAN.

The functions and data generated by the functioning of the multi-protocol infrastructure network devices 110 is capable of being distributed across multiple multi-protocol infrastructure network devices 110 or performed by a single multi-local protocol infrastructure network device. For example, a single multi-protocol infrastructure network device can be configured to detect irregular behavior of an IoT device and update an IoT policy accordingly for use by other multi-protocol infrastructure network devices. In another example, a plurality of multi-local protocol infrastructure network devices can maintain traffic pattern records of IoT devices for use in maintaining an IoT policy.

In an example of operation of the example system shown in FIG. 1, the WAN based IoT device management system 102 maintains an IoT policy for the IoT devices 108 through the WAN 104. In the example of operation of the example system shown in FIG. 1, the WAN based IoT device management system 102 manages the IoT devices 108 according to the IoT policy using the multi-protocol infrastructure network devices 110 providing the IoT devices 108 wireless network service access through the WLANs 106.

Figure 2:
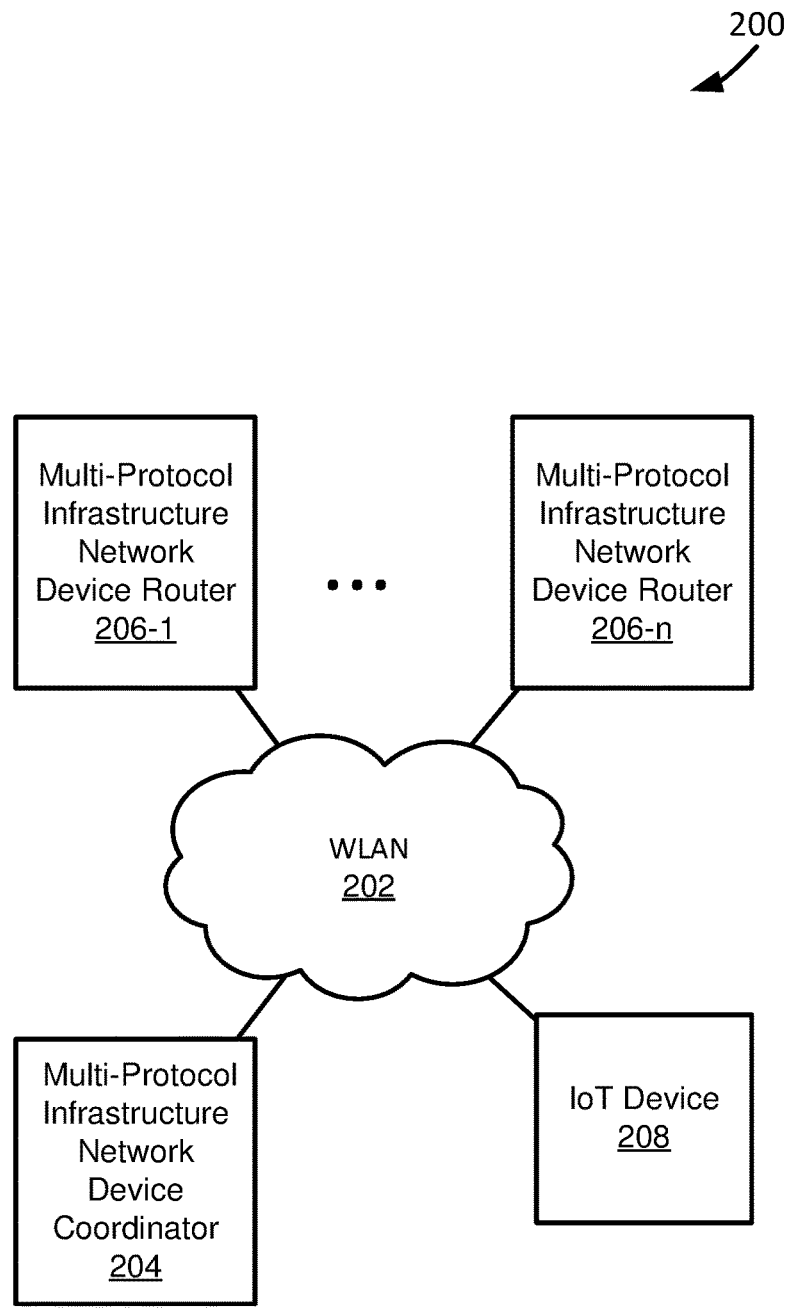
FIG. 2 depicts a diagram of an example of a system for managing IoT devices through a WLAN

FIG. 2 depicts a diagram 200 of an example of a system for managing IoT devices through a WLAN. The example system shown in FIG. 2 includes a WLAN 202, a multi-protocol infrastructure network device coordinator 204, multi-protocol infrastructure network devices router 206-1 . . . 206-n (hereinafter referred to as "multi-protocol infrastructure network device routers 206"), and an IoT device 208. In the example system shown in FIG. 2, the multi-protocol infrastructure network device coordinator 204, the multi-protocol infrastructure network device routers 206, and the IoT device 208 are coupled to each other through the WLAN 202.

The WLAN 202 functions to provide wireless communication channels through which IoT devices can wirelessly access network services of an enterprise or consumer network. The WLAN 202 can be established and maintained according to applicable wireless communication protocols or standards. For example, the WLAN 202 can be a Zig-Bee® based network. The WLAN 202 can be used in the management of IoT devices coupled to the WLAN 202. For example, the WLAN 202 can be used to, remotely and/or locally, control the flow of data to and from IoT devices coupled to the WLAN 202.

The multi-protocol infrastructure network device coordinator 204 functions as a coordinator for establishing and maintaining the WLAN 202 for purposes of providing network service access to IoT devices. The multi-protocol infrastructure network device coordinator 204 can function according to applicable devices for sending and receiving data in providing IoT devices network service access through the WLAN 202, such as the multi-protocol infrastructure network devices described in this paper. The multi-protocol infrastructure network device coordinator 204 can be used by an applicable system, such as the WAN based IoT device management systems described in this paper, to remotely manage IoT devices accessing network services through the WLAN 202. Additionally, the multi-protocol infrastructure network device coordinator 204 can function to locally manage IoT devices accessing network services through the WLAN 202.

The multi-protocol infrastructure network device coordinator 204 can provide network service access through a plurality of different WLANs established and maintained according to different wireless protocols. For example, the multi-protocol infrastructure network device coordinator 204 can provide network service access through a Wi-Fi based WLAN and also provide network service access through a ZigBee® based WLAN. In providing network service access to IoT devices through a plurality of different WLANs coupling the IoT devices to the multi-protocol infrastructure network device coordinator 204, the IoT devices can be managed through the WLANs.

In a specific implementation, the multi-protocol infrastructure network device coordinator 204 functions to be assigned to act as a coordinator. The multi-protocol infrastructure network device coordinator 204 can be assigned by an applicable system for managing IoT devices, such as the WAN based IoT device management systems described in this paper. In being assigned to act as a coordinator for establishing and maintaining the WLAN 202, the multi-protocol infrastructure network device coordinator 204 can receive WLAN instructions for use in establishing and maintaining the WLAN 202. WLAN instructions include applicable information related to establishment and maintenance of a WLAN, such as a wireless protocol to use in forming a WLAN, a type of WLAN to establish, and operating parameters for maintaining the WLAN. For example, the multi-protocol infrastructure network device coordinator 204 can receive WLAN instructions indicating to establish a ZigBee® based WLAN and operation parameters for maintaining the ZigBee® based WLAN.

In a specific implementation, the multi-protocol infrastructure network device coordinator 204 functions to establish a wireless communication channel for the WLAN 202. In establishing a wireless communication channel for the WLAN 202, the multi-protocol infrastructure network device coordinator 204 can select a frequency band and a channel within the frequency band to communicate over through the WLAN 202. For example, the multi-protocol infrastructure network device coordinator 204 can select one of 16 channels within the 2.4 GHz frequency band to communicate over in establishing and maintaining the WLAN 202. The multi-protocol infrastructure network device coordinator 204 can select a frequency band and a channel within the frequency band to communicate over in response to received WLAN instructions.

In a specific implementation, the multi-protocol infrastructure network device coordinator 204 functions to establish an identifier for the WLAN 202. In establishing an identifier for the WLAN 202, the multi-protocol infrastructure network device coordinator 204 can scan for other WLANs within range of the multi-protocol infrastructure network device coordinator 204 to determine identifiers used by the other WLANs. The multi-protocol infrastructure network device coordinator 204 can establish an identifier based on determined identifiers used by other WLANs within range of the multi-protocol infrastructure network device coordinator 204. For example, if a 16-bit PAN ID is already used by another WLAN, then the multi-protocol infrastructure network device coordinator 204 can select another 16-bit PAN ID different from the 16-bit PAN ID used by the other WLAN. Additionally, in establishing an identifier for the WLAN 202, the multi-protocol infrastructure network device coordinator 204 can select an extended identifier for use in resolving networking conflicts amongst WLANs. For example, the multi-protocol infrastructure network device coordinator 204 can select a 64-bit PAN ID to serve as an extended identifier for the WLAN 202.

In a specific implementation, the multi-protocol infrastructure network device coordinator 204 functions to manage node formation within the WLAN 202 as part of establishing and maintain the WLAN 202. In managing node formation, the multi-protocol infrastructure network device coordinator 204 can onboard multi-protocol infrastructure network device router to provide wireless access to network services as part of the WLAN 202. The multi-protocol infrastructure network device coordinator 204 can receive a join request from a multi-protocol infrastructure network devices router. In response to a join request, the multi-protocol infrastructure network device coordinator 204 can assign a WLAN node identifier to the multi-protocol infrastructure network device router and provide the WLAN node identifier along with a WLAN identifier to the multi-protocol infrastructure network device router. Additionally, in response to a join request, the multi-protocol infrastructure network device coordinator 204 can provide a WLAN extended identifier to a multi-protocol infrastructure network device router.

The multi-protocol infrastructure network device routers 206 functions as a node within the WLAN 202 configured to provide IoT devices wireless access to the WLAN 202. The multi-protocol infrastructure network device routers 206 can function according to applicable devices for sending and receiving data in providing IoT devices network service access through WLANs, such as the multi-protocol infrastructure network devices described in this paper. The multi-protocol infrastructure network device routers 206 can be used by an applicable system, such as the WAN based IoT device management systems described in this paper, to remotely manage IoT devices accessing network services through the WLAN 202. Additionally, the multi-protocol infrastructure network device coordinator 204 can function to locally manage IoT devices accessing network services through the WLAN 202.

The multi-protocol infrastructure network device routers 206 can provide network service access through a plurality of different WLANs established and maintained according to different wireless protocols. For example, the multi-protocol infrastructure network device routers 206 can provide network service access through a Wi-Fi based WLAN and also provide network service access through a ZigBee® based WLAN. In providing network service access to IoT devices through a plurality of different WLANs coupling the IoT devices to the multi-protocol infrastructure network device routers 206, the IoT devices can be managed through the WLANs.

In a specific implementation, the multi-protocol infrastructure network device routers 206 can send a join request to a multi-protocol infrastructure network device coordinator. In response to a join request, the multi-protocol infrastructure network device routers 206 corresponding WLAN node identifiers, a WLAN identifier, and/or an extended WLAN identifier. The multi-protocol infrastructure network device routers 206 can use one or a combination of corresponding WLAN node identifiers, a WLAN identifier, and an extended WLAN identifier in providing IoT devices with network service access through the WLAN 202.

The IoT device 208 functions according to an applicable device for sending and receive data through the WLAN 202, such as the IoT devices described in this paper. In an implementation where the WLAN 202 is a ZigBee® based WLAN, the IoT device 208 can functions as a ZigBee® end device. The IoT device 208 can be coupled to one or a combination of a multi-protocol infrastructure network device coordinator and a multi-protocol infrastructure network device router through the WLAN 202.

In an example of operation of the example system shown in FIG. 2, the multi-protocol infrastructure network device coordinator 204 receives WLAN instructions to establish and maintain the WLAN 202. In the example of operation of the example system shown in FIG. 2, the multi-protocol infrastructure network device coordinator 204 onboards the multi-protocol infrastructure network device routers 206 to provide network service access through the WLAN 202. Further, in the example of operation of the example system shown in FIG. 2, the IoT device accesses network services through the WLAN 202 using the multi-protocol infrastructure network device coordinator 204 and the multi-protocol infrastructure network device routers 206. In the example of operation of the example system shown in FIG. 2, as part of accessing network services through the WLAN 202, the IoT device 208 is managed using the WLAN 202.

Figure 3:
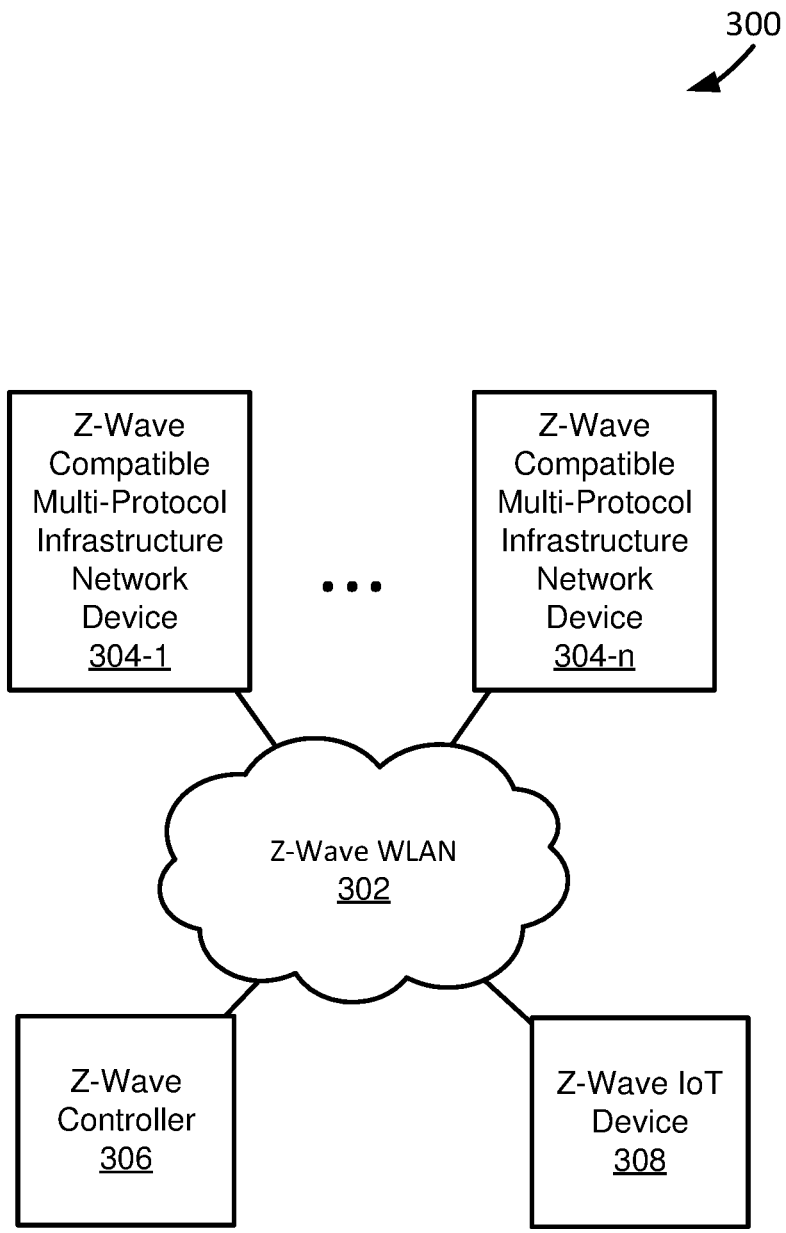
FIG. 3 depicts a diagram of an example of a system for managing Z-Wave® IoT devices using Z-Wave® compatible multi-protocol infrastructure network devices.

FIG. 3 depicts a diagram 300 of an example of a system for managing Z-Wave® IoT devices using Z-Wave® compatible multi-protocol infrastructure network devices. The example system shown in FIG. 3 includes a Z-Wave® WLAN 302, Z-Wave® compatible multi-protocol infrastructure network device 304-1 . . . 304-n (hereinafter referred to as "Z-Wave® compatible multi-protocol infrastructure network devices 304"), a Z-Wave® controller 306, and a Z-Wave® IoT device 308.

The Z-Wave® WLAN 302 functions to provide Z-Wave® based wireless communication channels through which Z-Wave® compatible IoT devices can wirelessly access network services. The Z-Wave® WLAN 302 can be used in the management of Z-Wave® compatible IoT devices coupled to the Z-Wave® WLAN 302. For example, the Z-Wave® WLAN 302 can be used to, remotely and/or locally, control the flow of data to and from Z-Wave® compatible IoT devices coupled to the Z-Wave® WLAN 302. The Z-Wave® WLAN 302 is a mesh network that can have traffic routed through it using source routing.

The Z-Wave® compatible multi-protocol infrastructure network devices 304 functions as a node within the Z-Wave® WLAN 302 configured to provide IoT devices wireless access to the Z-Wave® WLAN 302. The Z-Wave® compatible multi-protocol infrastructure network devices 304 can function according to applicable devices for sending and receiving data in providing IoT devices network service access through WLANs, such as the multi-protocol infrastructure network devices described in this paper. In various implementations, the Z-Wave® compatible multi-protocol infrastructure network devices 304 can route data through the Z-Wave® LAN using source routing. The Z-Wave® compatible multi-protocol infrastructure network devices 304 can be used by an applicable system, such as the WAN based IoT device management systems described in this paper, to remotely manage IoT devices accessing network services through the Z-Wave® WLAN 302. Additionally, the Z-Wave® compatible multi-protocol infrastructure network devices 304 can function to locally manage IoT devices accessing network services through the Z-Wave® WLAN 302.

The Z-Wave® compatible multi-protocol infrastructure network devices 304 can provide network service access through a plurality of different WLANs established and maintained according to different wireless protocols. For example, the Z-Wave® compatible multi-protocol infrastructure network devices 304 can provide network service access through a Wi-Fi based WLAN and also provide network service access through a ZigBee® based WLAN. In providing network service access to IoT devices through a plurality of different WLANs coupling the IoT devices to the Z-Wave® compatible multi-protocol infrastructure network devices 304, the IoT devices can be managed through the WLANs.

The Z-Wave® controller 306 functions to manage Z-Wave® compatible IoT devices using the Z-Wave® WLAN 302. The Z-Wave® controller and/or the functions it performs can be implemented as part of an applicable system for remotely managing IoT devices, such as the WAN based IoT device management systems described in this paper. In being implemented through or as part of an applicable system for remotely managing IoT devices, such as the WAN based IoT device management systems described in this paper, the Z-Wave® controller can perform the functions of the WAN based IoT device management systems described in this paper. Additionally, the Z-Wave® controller 306 can be implemented as a physical device on premise of the Z-Wave® WLAN 302. The Z-Wave® controller can function to pair Z-Wave® IoT devices to access network services through the Z-Wave® WLAN 302. After pairing a Z-Wave® IoT device, the device can wireless access the Z-Wave® WLAN 302 and subsequently access services through the Z-Wave® WLAN 302.

The Z-Wave® IoT device 308 functions according to an applicable device for sending and receive data through the Z-Wave® WLAN 302, such as the Z-Wave® compatible IoT devices described in this paper. The Z-Wave® IoT device 308 can be coupled to one or a combination of Z-Wave® compatible multi-protocol infrastructure network devices 304 through the Z-Wave® WLAN 302. Additionally, the Z-Wave® IoT device 308 can access network services through other WLANs separate from the Z-Wave® WLAN 302. For example, the Z-Wave® IoT device 308 can access network services through a Wi-Fi based WLAN while accessing network services through the Z-Wave® WLAN 302.

Figure 4:
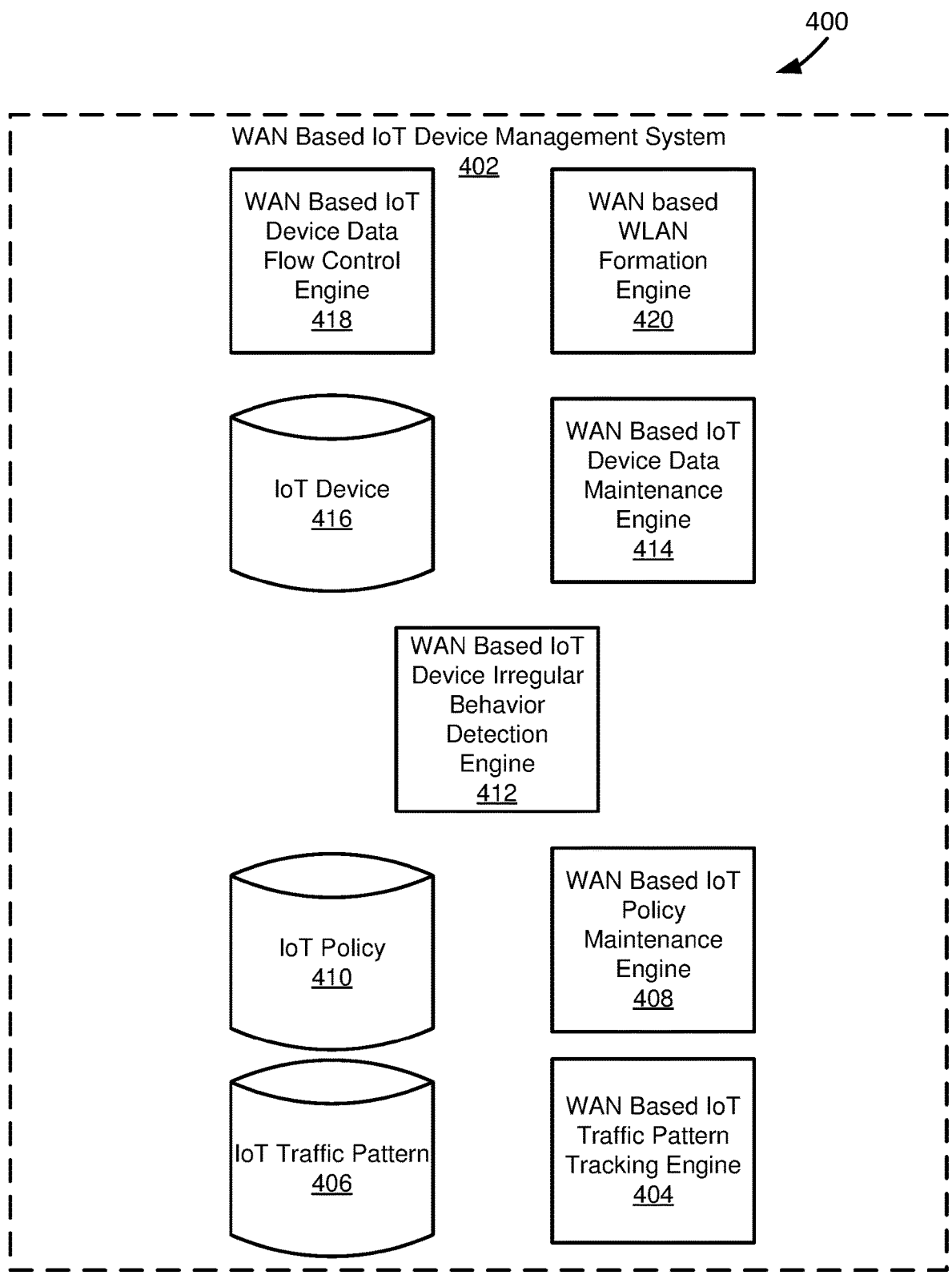
FIG. 4 depicts a diagram of an example of a WAN based IoT device management system for remotely managing IoT devices over a WAN through WLANs provided through multi-protocol infrastructure network devices.

FIG. 4 depicts a diagram 400 of an example of a WAN based IoT device management system 402 for remotely managing IoT devices over a WAN through WLANs provided through multi-protocol infrastructure network devices. The WAN based IoT device management system 402 can function to manage IoT devices by controlling the flow of data to and from the IoT devices through a WLAN. For example, the WAN based IoT device management system 402 can control the flow of data to an IoT device through a WLAN coupling the IoT device to a multi-protocol infrastructure network device. In managing IoT devices over a WAN, the WAN based IoT device management system 402 can maintain an IoT policy and manage IoT devices according to the IoT policy. The WAN based IoT device management system 402 can maintain an IoT policy based on traffic pattern records of data sent to and from IoT devices.

In the example system shown in FIG. 4, the WAN based IoT device management system 402 includes a WAN based IoT traffic pattern tracking engine 404, an IoT traffic pattern datastore 406, a WAN based IoT policy maintenance engine 408, an IoT policy datastore 410, a WAN based IoT device irregular behavior detection engine 412, a WAN based IoT device data maintenance engine 414, an IoT device datastore 416, a WAN based IoT device data flow control engine 418, and a WAN based WLAN formation engine 420.

The WAN based IoT traffic pattern tracking engine 404 functions to remotely maintain traffic pattern records of data sent to and from IoT devices. In maintaining traffic pattern records, the WAN based IoT traffic pattern tracking engine 404 can generate and/or update traffic pattern data based on traffic patterns of data sent to and from IoT devices. The WAN based IoT traffic pattern tracking engine 404 can maintain traffic pattern records for all of a subset of IoT devices within a WLAN, a LAN, or a consumer or enterprise network. Additionally, the WAN based IoT traffic pattern tracking engine 404 can maintain traffic pattern records for IoT devices across different consumer or enterprise networks.

In a specific implementation, the WAN based IoT traffic pattern tracking engine 404 functions to maintain traffic pattern records for IoT devices based on data traffic flow through an applicable network device forming an applicable node within an enterprise or consumer network. For example, the WAN based IoT traffic pattern tracking engine 404 can maintain traffic pattern records for IoT devices based on data traffic flow through multi-protocol infrastructure network devices providing wireless network service access to IoT devices through WLANs. In another example, the WAN based IoT traffic pattern tracking engine 404 can maintain traffic pattern records for IoT devices based on data traffic flow through network devices in a LAN back-end. The WAN based IoT traffic pattern tracking engine 404 can maintain traffic pattern records based on network traffic logs maintained by applicable network devices forming applicable nodes within an enterprise or consumer network. For example, the WAN based IoT traffic pattern tracking engine 404 can maintain traffic pattern records based on network traffic logs maintained by network devices forming a LAN back-end. In another example, the WAN based IoT traffic pattern tracking engine 404 can maintain traffic pattern records based on network traffic logs maintained at edge device providing IoT devices wireless network service access through a WLAN.

In a specific implementation, the WAN based IoT traffic pattern tracking engine 404 functions to receive packet inspection data. The WAN based IoT traffic pattern tracking engine 404 can receive packet inspection data from an applicable device forming an applicable node within an enterprise or consumer network. For example, the WAN based IoT traffic pattern tracking engine 404 can receive packet inspection data from network devices forming a LAN back-end and/or edge devices providing IoT devices wireless network service access through a WLAN. The WAN based IoT traffic pattern tracking engine 404 can use received packet inspection data to maintain traffic pattern records for IoT devices. For example, if packet inspection data is analyzed to determine a specific IoT device communicates with another IoT device at a specific time every day, then the WAN based IoT traffic pattern tracking engine 404 can update traffic pattern records for the IoT devices to indicate they communicate with each at the specific time every day.

The IoT traffic pattern datastore 406 functions to store IoT traffic pattern data. IoT traffic pattern data stored in the IoT traffic pattern datastore 406 indicates traffic pattern records of data sent to and from IoT devices. Traffic pattern data stored in the IoT traffic pattern datastore 406 can indicate traffic pattern records for all or a subset of IoT devices within a WLAN, a LAN, or a consumer or enterprise network. Additionally, traffic pattern data stored in the IoT traffic pattern datastore 406 can indicate traffic pattern records of IoT devices across different consumer or enterprise networks.

The WAN based IoT policy maintenance engine 408 functions to maintain an IoT policy for managing IoT devices through a WLAN. An IoT policy maintained by the WAN based IoT policy maintenance engine 408 can be used to remotely manage IoT devices through a WLAN. For example, an applicable remote engine for controlling data flow to and from IoT devices through a WLAN, can use an IoT policy maintained by the WAN based IoT policy maintenance engine 408 to remotely control data flow to and from an IoT device through a WLAN. Additionally, an IoT policy maintained by the WAN based IoT policy maintenance engine 408 can be used to locally manage IoT devices through a WLAN. For example, the WAN based IoT policy maintenance engine 408 can send an IoT policy to edge devices providing network service access to IoT devices through WLANs, which can subsequently use the IoT policy to locally manage, at the edge devices, the IoT devices.

In a specific implementation, the WAN based IoT policy maintenance engine 408 functions to maintain an IoT policy according to user or administrator input. For example, a user or administrator can provide input indicating first and second IoT devices are not allowed to communicate with each other. In response to the input, the WAN based IoT policy maintenance engine 408 can update an IoT policy to indicate blocking communication between the first and second IoT devices.

In a specific implementation, the WAN based IoT policy maintenance engine 408 functions to maintain an IoT policy according to traffic pattern records of IoT devices. In maintaining an IoT policy according to traffic pattern records of IoT devices, the WAN based IoT policy maintenance engine 408 can update an IoT policy to allow for IoT device behavior observed through the traffic pattern records of the IoT devices. Additionally, the WAN based IoT policy maintenance engine 408 can maintain an IoT policy according to detection of irregular IoT device behavior from traffic pattern records of IoT devices. For example, if an IoT device is behaving irregularly, according to traffic pattern records of the IoT device, then the WAN based IoT policy maintenance engine 408 can update an IoT policy to block data transmitted to and from the IoT device in the IoT device behaving irregularly. In another example, if an IoT device is behaving irregularly, according to traffic pattern records of the IoT device, then the WAN based IoT policy maintenance engine 408 can update an IoT policy to indicate shutting down the IoT device and/or blocking the transmission of all data to and from the IoT device.

The IoT policy datastore 410 functions to store IoT policy data indicating an IoT policy used in managing IoT devices through WLANs. An IoT policy indicated by IoT policy data stored in the IoT policy datastore 410 can be used to remotely manage IoT devices through a WLAN. For example, an applicable remote engine for controlling data flow to and from IoT devices through a WLAN, can use an IoT policy indicated by IoT policy data stored in the IoT policy datastore 410 to remotely control data flow to and from an IoT device through a WLAN. Additionally, an IoT policy stored in the IoT policy datastore 410 can be used to locally manage IoT devices through a WLAN. For example, IoT policy data stored in the IoT policy datastore 410 can be sent to edge devices providing network service access to IoT devices through WLANs, which can subsequently use the IoT policy data to locally manage, at the edge devices, the IoT devices.

The WAN based IoT device irregular behavior detection engine 412 functions to detect irregular IoT device behavior. The WAN based IoT device irregular behavior detection engine 412 can detect irregular IoT device behavior according to traffic pattern records of IoT devices in accessing network services through WLANs coupling the IoT devices to multi-protocol infrastructure network devices. For example, the WAN based IoT device irregular behavior detection engine 412 can compare historical traffic pattern records of IoT devices in accessing network services to current traffic pattern records of the IoT devices to determine if the IoT devices are acting differently, hence irregularly, according to their traffic pattern records. An IoT policy can be updated according to irregular IoT device behavior detected by the WAN based IoT device irregular behavior detection engine 412. Additionally, IoT device data can be updated according to irregular IoT device behavior detected by the WAN based IoT device irregular behavior detection engine 412.

The WAN based IoT device data maintenance engine 414 functions to maintain IoT device data. The WAN based IoT device data maintenance engine 414 can maintain IoT device data based on traffic pattern records of IoT devices. For example, the WAN based IoT device data maintenance engine 414 can determine from traffic pattern records that an IoT device is communicating with a specific user device, and update IoT device behavior to indicate the IoT device is communicating with a specific user device. In another example, traffic pattern records can indicate an IoT device is still broadcasting data, and therefore is powered on, and the WAN based IoT device data maintenance engine 414 can update IoT device data to indicate the IoT device is currently powered on. Additionally, the WAN based IoT device data maintenance engine 414 can maintain IoT device data based on detected irregular IoT device behavior. For example, if an IoT device is behaving irregularly, then the WAN based IoT device data maintenance engine 414 can update IoT device data to indicate the IoT device is behaving irregularly and how the device is actually behaving irregularly.

In a specific implementation, the WAN based IoT device data maintenance engine 414 functions to publish or facilitate publication of IoT device data. The WAN based IoT device data maintenance engine 414 can publish or facilitate publication of IoT device data for cloud based access for a user or administrator. For example, the WAN based IoT device data maintenance engine 414 can publish IoT device data where a user can access the data through cloud based access. In another example, the WAN based IoT device data maintenance engine 414 can provide IoT device data to a cloud publishing broker, e.g. a MQTT broker, who can subsequently publish the IoT device data for cloud based access by a user or administrator.

In a specific implementation, the WAN based IoT device data maintenance engine 414 functions to send IoT device data directly to a user or administrator. For example, the WAN based IoT device data maintenance engine 414 can send a report on the status, as indicated by IoT device data, of a user's IoT devices to a user's client device using a text messaging service, e.g. SMS. In another example, the WAN based IoT device data maintenance engine 414 can email to a user a report on the status, as indicated by IoT device data, of the user's IoT devices.

The IoT device datastore 416 functions to store IoT device data. IoT device data stored in the IoT device datastore 416 can be generated based on traffic pattern records of IoT devices. Additionally, IoT device data stored in the IoT device datastore 416 can be generated based on detection of irregular IoT device behavior.

The WAN based IoT device data flow control engine 418 functions to remotely control the transmission of data to and from IoT devices through WLANs. In remotely controlling the transmission of data to and from IoT devices, the WAN based IoT device data flow control engine 418 can instruct an applicable device forming an applicable node in a consumer or enterprise network whether or not to transmit specific data to and from specific IoT devices. For example, the WAN based IoT device data flow control engine 418 can instruct network devices forming a LAN back-end to refrain from transmitting data transmitted between specific IoT devices. In another example, the WAN based IoT device data flow control engine 418 can instruct edge devices providing IoT devices wireless network service access through WLANs, such as the multi-protocol infrastructure network devices described in this paper, to always transmit data between specific IoT devices. In remotely controlling the transmission of data to and from IoT devices through WLANs, the WAN based IoT device data flow control engine 418 can function to manage the IoT devices through the WLANs.

In a specific implementation, the WAN based IoT device data flow control engine 418 functions to remotely control the transmission of data to and from IoT devices through WLANs according to an IoT policy. For example, if an IoT policy specifies that an IoT device is not allowed to communicate with sources on the Internet, then the WAN based IoT device data flow control engine 418 can instruct network devices forming a LAN back-end to which the IoT device is coupled through a WLAN, to stop transmitting data between the IoT device and the sources on the Internet. In another example, if an IoT policy specifies that a first IoT device is not allowed to communicate with a second IoT device, then the WAN based IoT device data flow control engine 418 can instruct edge devices providing the first and second IoT devices wireless network service access through a WLAN to stop transmitting data between the first and second IoT devices. In remotely controlling transmission of data to and from IoT devices through WLANs according to an IoT policy, the WAN based IoT device data flow control engine 418 can use IoT traffic pattern records. For example, if current IoT traffic pattern records indicate first and second IoT devices are communicating with each other, and an IoT policy specifies the first and second IoT device are not allowed to communicate with each other, then the WAN based IoT device data flow control engine 418 can instruct a network device used in transmitting data between the first and second IoT devices to stop transmitting data destined from the first IoT device to the second IoT device and vice versa.

In a specific implementation, the WAN based IoT device data flow control engine 418 functions to remotely control operating of an IoT device. In remotely controlling operating of an IoT device, the WAN based IoT device data flow control engine 418 can send operating instructions to or cause operating instructions to be sent to an IoT device, subsequently causing the IoT device to operate in a specific way. For example, the WAN based IoT device data flow control engine 418 can send operating instructions to lights instructing the lights to shut off. In another example, the WAN based IoT device data flow control engine 418 can instruct an applicable network device or edge device to send operating instructions to lights coupled to the device through a WLAN.

The WAN based WLAN formation engine 420 functions to remotely manage establishment and maintenance of WLANs through which IoT devices can access network services. In managing WLAN establishment and maintenance, the WAN based WLAN formation engine 420 can assign an applicable network device to coordinate establish and maintain a WLAN. For example, the WAN based WLAN formation engine 420 can instruct a multi-protocol infrastructure network device to act as a ZigBee® coordinator for establishing and maintaining a ZigBee® WLAN through which IoT devices can access network services. Additionally, in managing WLAN establishment and maintenance, the WAN based WLAN formation engine 420 can send WLAN instructions to an assigned network device instructing the network device how to establish and maintain a WLAN network. For example, the WAN based WLAN formation engine 420 can send WLAN instructions to an assigned multi-protocol infrastructure network device instructing the network device to act as a coordinator for establishing and maintaining a ZigBee® WLAN.

In an example of operation of the example system shown in FIG. 4, the WAN based IoT traffic pattern tracking engine 404 receives packet inspection data. In the example of operation of the example system shown in FIG. 4, the WAN based IoT traffic pattern tracking engine 404 uses the packet inspection data to maintain IoT traffic pattern data in the IoT traffic pattern datastore 406 indicating traffic pattern records of data sent to and from IoT devices. Further, in the example of operation of the example system shown in FIG. 4, the WAN based IoT policy maintenance engine 408 maintains an IoT policy, as indicated by IoT policy data stored in the IoT policy datastore 410, for managing the IoT devices through WLANs used by the IoT device to gain network access. In the example of operation of the example system shown in FIG. 4, the WAN based IoT policy maintenance engine maintains an IoT policy according to the determined traffic pattern records of data sent to and from the IoT devices. Additionally, in the example of operation of the example system shown in FIG. 4, the WAN based IoT device data flow control engine 418 remotely control applicable network devices forming nodes within an enterprise or consumer network to control transmission of data to and from the IoT devices as part of managing the IoT device according to the IoT policy.

Figure 5:
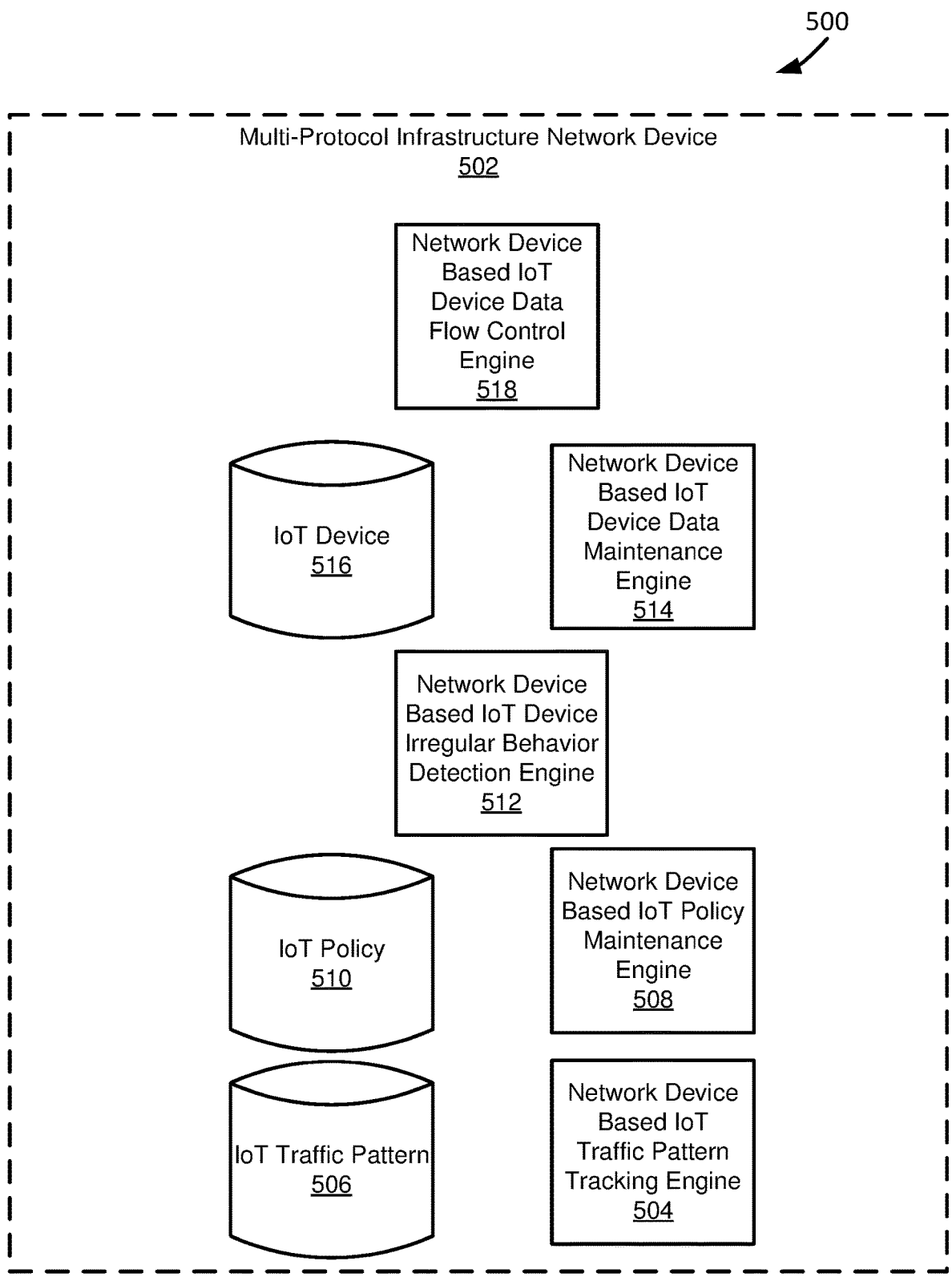
FIG. 5 depicts a diagram of an example of a multi-protocol infrastructure network device 502 configured to provide IoT devices network service access through WLANs.

FIG. 5 depicts a diagram 500 of an example of a multi-protocol infrastructure network device 502 configured to provide IoT devices network service access through WLANs. The multi-protocol infrastructure network device 502 functions according to an applicable device for providing IoT devices network service access through WLANs, such as the multi-protocol infrastructure network devices described in this paper. The multi-protocol infrastructure network device 502 can function to manage or be used in managing IoT devices through the IoT devices accessing network services through a WLAN using the multi-protocol infrastructure network device 502. In managing or being used in managing IoT devices through accessing network services through a WLAN using the multi-protocol infrastructure network device 502, the multi-protocol infrastructure network device 502 can function to control the flow of data to and from IoT devices in accessing the network services through the WLAN. The multi-protocol infrastructure network device 502 can be remotely managed in controlling the flow of data to and from an IoT device through a WLAN by an applicable system for remotely managing IoT devices, such as the WAN based IoT device management systems described in this paper. Additionally, the multi-protocol infrastructure network device 502 can locally manage itself in controlling the flow of data to and from an IoT device through a WLAN.

In the example system shown in FIG. 5, the multi-protocol infrastructure network device 502 includes a network device based IoT traffic pattern tracking engine 504, an IoT traffic pattern datastore 506, a network device based IoT policy maintenance engine 508, an IoT policy datastore 510, a network device based IoT device irregular behavior detection engine 512, a network device based IoT device data maintenance engine 514, an IoT device datastore 516, and a network device based IoT device data flow control engine 518.

The network device based IoT traffic pattern tracking engine 504 functions to locally maintain, at the multi-protocol infrastructure network device 502, IoT traffic pattern records of IoT devices in accessing network services. The network device based IoT traffic pattern tracking engine 504 can generate and/or update traffic pattern data based on data sent to and from IoT devices as part of the IoT devices accessing network services. The network device based IoT traffic pattern tracking engine 504 can maintain traffic pattern records for all or a subset of IoT devices within a LAN or a WLAN. For example, the network device based IoT traffic pattern tracking engine 504 can maintain traffic pattern records of IoT devices accessing network services through WLANs using all or a subset of multi-protocol infrastructure network devices within a LAN, including the multi-protocol infrastructure network device 502. Traffic pattern records maintained by the network device based IoT traffic pattern tracking engine 504 locally at the multi-protocol infrastructure network device 502 can be distributed by the network device based IoT traffic pattern tracking engine 504 to other multi-protocol infrastructure network devices.

In a specific implementation, the network device based IoT traffic pattern tracking engine 504 functions to inspect data packets sent to and from IoT devices in accessing network services through WLANs. The network device based IoT traffic pattern tracking engine 504 can inspect data packets according to an applicable technique for performing packet inspection. For example, the network device based IoT traffic pattern tracking engine 504 can locally perform deep packet inspection on the data packets. In locally inspecting data packets sent to and from IoT devices over WLANs, the network device based IoT traffic pattern tracking engine 504 can locally maintain traffic patterns records for the IoT devices. For example, if through deep packet inspection, the network device based IoT traffic pattern tracking engine 504 determines an IoT device is sending specific instructions to another IoT device, then network device based IoT traffic pattern tracking engine 504 can locally update a traffic pattern record to indicate the IoT device is sending the specific instructions to IoT devices. Additionally, in locally inspecting data packets sent to and from IoT devices over WLANs, the network device based IoT traffic pattern tracking engine 504 can generate and subsequently send packet inspection data. For example, the network device based IoT traffic pattern tracking engine 504 can send generated packet inspection data to a remote system or other multi-protocol infrastructure network devices within a LAN.

In a specific implementation, the network device based IoT traffic pattern tracking engine 504 functions to receive packet inspection data from multi-protocol infrastructure network devices within a LAN. For example, if the network device based IoT traffic pattern tracking engine 504 is implemented on a first multi-protocol infrastructure network device in a LAN, the network device based IoT traffic pattern tracking engine 504 can function to receive packet inspection data from other multi-protocol infrastructure network devices within the LAN. The network device based IoT traffic pattern tracking engine 504 can use received packet inspection data to locally maintain traffic pattern records for IoT devices accessing network services through a LAN. For example, the network device based IoT traffic pattern tracking engine 504 can use packet inspection data received from another multi-protocol infrastructure network device to maintain traffic pattern records of IoT devices accessing network services through WLANs using the another multi-protocol infrastructure network device.

The IoT traffic pattern datastore 506 functions according to an applicable datastore for storing IoT traffic pattern data, such as the IoT traffic pattern datastores described in this paper. IoT traffic pattern data stored in the IoT traffic pattern datastore 506 can be locally maintained at the multi-protocol infrastructure network device 502. Additionally, IoT traffic pattern data stored in the IoT traffic pattern datastore 506 can be received from an applicable remote system for managing IoT devices, such as the WAN based IoT device management systems described in this paper.

The network device based IoT policy maintenance engine 508 functions to locally maintain an IoT policy for use in managing IoT devices. An IoT policy maintained by the network device based IoT policy maintenance engine 508 can be used to locally manage IoT devices in accessing network services through a WLAN using the multi-protocol infrastructure network device 502. For example, data flow through a WLAN used by an IoT device in wirelessly accessing network services using the multi-protocol infrastructure network device 502 can be controlled at the multi-protocol infrastructure network device 502 according to an IoT policy maintained by the network device based IoT policy maintenance engine 508. An IoT policy locally maintained by the network device based IoT policy maintenance engine 508 at the multi-protocol infrastructure network device 502 can be distributed by the network device based IoT policy maintenance engine 508 to other multi-protocol infrastructure network devices.

In a specific implementation, the network device based IoT policy maintenance engine 508 functions to maintain an IoT policy according to user or administrator input. For example, a user or administrator can provide input indicating first and second IoT devices are not allowed to communicate with each other. In response to the input, the network device based IoT policy maintenance engine 508 can update an IoT policy to indicate blocking communication between the first and second IoT devices.

In a specific implementation, the network device based IoT policy maintenance engine 508 functions to locally maintain an IoT policy according to an IoT policy maintained remotely. Specifically, the network device based IoT policy maintenance engine 508 can locally maintain an IoT policy based on an IoT policy maintained remotely by an applicable system for remotely managing IoT devices, such as the WAN based IoT device management systems described in this paper. For example, the network device based IoT policy maintenance engine 508 can receive a new IoT policy which is remotely maintained, and subsequently update a locally stored IoT policy, as part of locally maintaining an IoT policy, in accordance with the new IoT policy.

In a specific implementation, the network device based IoT policy maintenance engine 508 functions to locally maintain an IoT policy according to traffic pattern records of IoT devices. In maintaining an IoT policy according to traffic pattern records of IoT devices, the network device based IoT policy maintenance engine 508 can update an IoT policy to allow for IoT device behavior observed through the traffic pattern records of the IoT devices. Additionally, the network device based IoT policy maintenance engine 508 can maintain an IoT policy according to detection of irregular IoT device behavior from traffic pattern records of IoT devices. For example, if an IoT device is behaving irregularly, according to traffic pattern records of the IoT device, then the network device based IoT policy maintenance engine 508 can update an IoT policy to block data transmitted to and from the IoT device in the IoT device behaving irregularly. In another example, if an IoT device is behaving irregularly, according to traffic pattern records of the IoT device, then the network device based IoT policy maintenance engine 508 can update an IoT policy to indicate shutting down the IoT device and/or blocking the transmission of all data to and from the IoT device.

The IoT policy datastore 510 functions according to an applicable datastore for storing IoT policy data, such as the IoT policy datastores described in this paper. The IoT policy datastore 510 can store IoT policy data generated locally at the multi-protocol infrastructure network device 502. Additionally, the IoT policy datastore 510 can store IoT policy data generated remotely from the multi-protocol infrastructure network device 502.

The network device based IoT device irregular behavior detection engine 512 functions to locally detect irregular IoT device behavior. The network device based IoT device irregular behavior detection engine 512 can detect irregular IoT device behavior according to traffic pattern records of IoT devices in accessing network services through WLANs coupling the IoT devices to multi-protocol infrastructure network devices. For example, the network device based IoT device irregular behavior detection engine 512 can compare historical traffic pattern records of IoT devices in accessing network services to current traffic pattern records of the IoT devices to determine if the IoT devices are acting differently, hence irregularly, according to their traffic pattern records. An IoT policy can be locally updated according to irregular IoT device behavior detected by the network device based IoT device irregular behavior detection engine 512. Additionally, IoT device data can be locally updated according to irregular IoT device behavior detected by the network device based IoT device irregular behavior detection engine 512. The network device based IoT device irregular behavior detection engine 512 can detect irregular IoT device behavior of an IoT device wirelessly accessing network services through a WLAN using the multi-protocol infrastructure network device 502 and/or detect irregular IoT device behavior of an IoT device wirelessly access network services using another multi-protocol infrastructure network device.

The network device based IoT device data maintenance engine 514 functions to locally maintain IoT device data. The network device based IoT device data maintenance engine 514 can locally maintain IoT device data based on traffic pattern records of IoT devices. For example, the network device based IoT device data maintenance engine 514 can determine from traffic pattern records that an IoT device is communicating with a specific user device, and update IoT device behavior to indicate the IoT device is communicating with a specific user device. In another example, traffic pattern records can indicate an IoT device is still broadcasting data, and therefore is powered on, and the network device based IoT device data maintenance engine 514 can update IoT device data to indicate the IoT device is currently powered on. The network device based IoT device data maintenance engine 514 can maintain IoT device data for an IoT device wirelessly accessing network services through a WLAN using the multi-protocol infrastructure network device 502 and/or maintain IoT device data for an IoT device wirelessly access network services using another multi-protocol infrastructure network device.

In a specific implementation, the network device based IoT device data maintenance engine 514 can locally maintain IoT device data based on detected irregular IoT device behavior. For example, if an IoT device is behaving irregularly, then the network device based IoT device data maintenance engine 514 can update IoT device data to indicate the IoT device is behaving irregularly and how the device is actually behaving irregularly. Further in the example, the irregular behavior of the IoT device can be detected locally at the multi-protocol infrastructure network device 502.

In a specific implementation, the network device based IoT device data maintenance engine 514 functions to publish or facilitate publication of IoT device data. The network device based IoT device data maintenance engine 514 can publish or facilitate publication of IoT device data for cloud based access for a user or administrator. For example, the network device based IoT device data maintenance engine 514 can publish IoT device data where a user can access the data through cloud based access. In another example, the network device based IoT device data maintenance engine 514 can provide IoT device data to a cloud publishing broker, e.g. a MQTT broker, who can subsequently publish the IoT device data for cloud based access by a user or administrator. In various implementations, a user can utilize the multi-protocol infrastructure network device 502 to access the cloud and subsequently IoT device data.

In a specific implementation, the network device based IoT device data maintenance engine 514 functions to send IoT device data directly to a user or administrator. For example, the network device based IoT device data maintenance engine 514 can send a report on the status, as indicated by IoT device data, of a user's IoT devices to a user's client device using a text messaging service, e.g. SMS. In another example, the network device based IoT device data maintenance engine 514 can email to a user a report on the status, as indicated by IoT device data, of the user's IoT devices. In various implementations, the network device based IoT device data maintenance engine 514 can send IoT device data directly to a user or administrator over a wireless connection formed between a device of the user or administrator and the multi-protocol infrastructure network device. For example, a user can come on premises and wirelessly connect their device to the multi-protocol infrastructure network device 502 and subsequently be sent a report of the status of their IoT devices through the wireless connection formed with the multi-protocol infrastructure network device 502.

The IoT device datastore 516 functions according to an applicable datastore for storing IoT device data, such as the IoT device datastores described in this paper. The IoT device datastore 516 can store IoT device data generated locally at the multi-protocol infrastructure network device 502. Additionally, the IoT device datastore 516 can store IoT device data generated remotely from the multi-protocol infrastructure network device 502.

The network device based IoT device data flow control engine 518 functions to locally control the transmission of data to and from IoT devices through WLANs. In locally controlling the transmission of data to and from IoT devices, the network device based IoT device data flow control engine 518 can control the transmission of data to and from IoT devices through the multi-protocol infrastructure network device 502. For example, the network device based IoT device data flow control engine 518 can control the transmission of data to and from IoT devices accessing network services through WLANs using the multi-protocol infrastructure network device 502. Additionally, in locally controlling the transmission of data to and from IoT devices, the network device based IoT device data flow control engine 518 can control the transmission of data to and from IoT devices through multi-protocol infrastructure network devices other than the multi-protocol infrastructure network device 502. For example, the network device based IoT device data flow control engine 518 can control the transmission of data to and from IoT devices accessing network services through WLANs using other multi-protocol infrastructure network devices within a LAN of the multi-protocol infrastructure network device 502. Further in the example, by controlling the transmission of data to and from the IoT devices using the other multi-protocol infrastructure network devices, the network device based IoT device data flow control engine 518 can instruct the other multi-protocol infrastructure network devices how to transmit data to and from the IoT devices.

In a specific implementation, the network device based IoT device data flow control engine 518 functions to locally control the transmission of data to and from IoT devices through WLANs according to an IoT policy. For example, if an IoT policy specifies that an IoT device is not allowed to communicate with sources on the Internet, then the network device based IoT device data flow control engine 518 can block and/or instruct other network devices to block the transmission of data between the IoT device and the sources on the Internet. In another example, if an IoT policy specifies that a first IoT device is not allowed to communicate with a second IoT device, then the network device based IoT device data flow control engine 518 can block and/or instruct other network devices to block the transmission of data between the first and second IoT devices. In locally controlling transmission of data to and from IoT devices through WLANs according to an IoT policy, the network device based IoT device data flow control engine 518 can use IoT traffic pattern records. For example, if current IoT traffic pattern records indicate first and second IoT devices are communicating with each other, and an IoT policy specifies the first and second IoT device are not allowed to communicate with each other, then the network device based IoT device data flow control engine 518 can block and/or instruct other network devices to block the transmission of data between the first and second IoT devices.

In a specific implementation, the network device based IoT device data flow control engine 518 functions to locally control operating of an IoT device. In locally controlling operating of an IoT device, the network device based IoT device data flow control engine 518 can send operating instructions to or instruct another network device to send operating instructions to an IoT device, subsequently causing the IoT device to operate in a specific way. For example, the network device based IoT device data flow control engine 518 can send operating instructions to lights coupled to the multi-protocol infrastructure network device 502 causing the lights to shut off. In another example, the network device based IoT device data flow control engine 518 can instruct another multi-protocol infrastructure network device coupled to lights through a WLAN to send operating instructions to the lights causing the lights to shut off.

In an example of operation of the example system shown in FIG. 5, the network device based IoT traffic pattern tracking engine locally inspects data packets sent to and from IoT devices coupled to the multi-protocol infrastructure network device 502 through WLANs and accessing network services through the WLANs. In the example of operation of the example system shown in FIG. 5, the network device based IoT traffic pattern tracking engine 504 generates traffic pattern records, as indicated by IoT traffic pattern data stored in the IoT traffic pattern datastore 506, based on inspection of the data packets. Further, in the example of operation of the example system shown in FIG. 5, the network device based IoT policy maintenance engine 508 locally maintains an IoT policy at the multi-protocol infrastructure network device 502. In the example of operation of the example system shown in FIG. 5, the network device based IoT device data flow control engine 518 locally controls the transmission of data to and from the IoT devices through the WLANs using current traffic pattern records for the IoT devices and the IoT policy.

Figure 6:
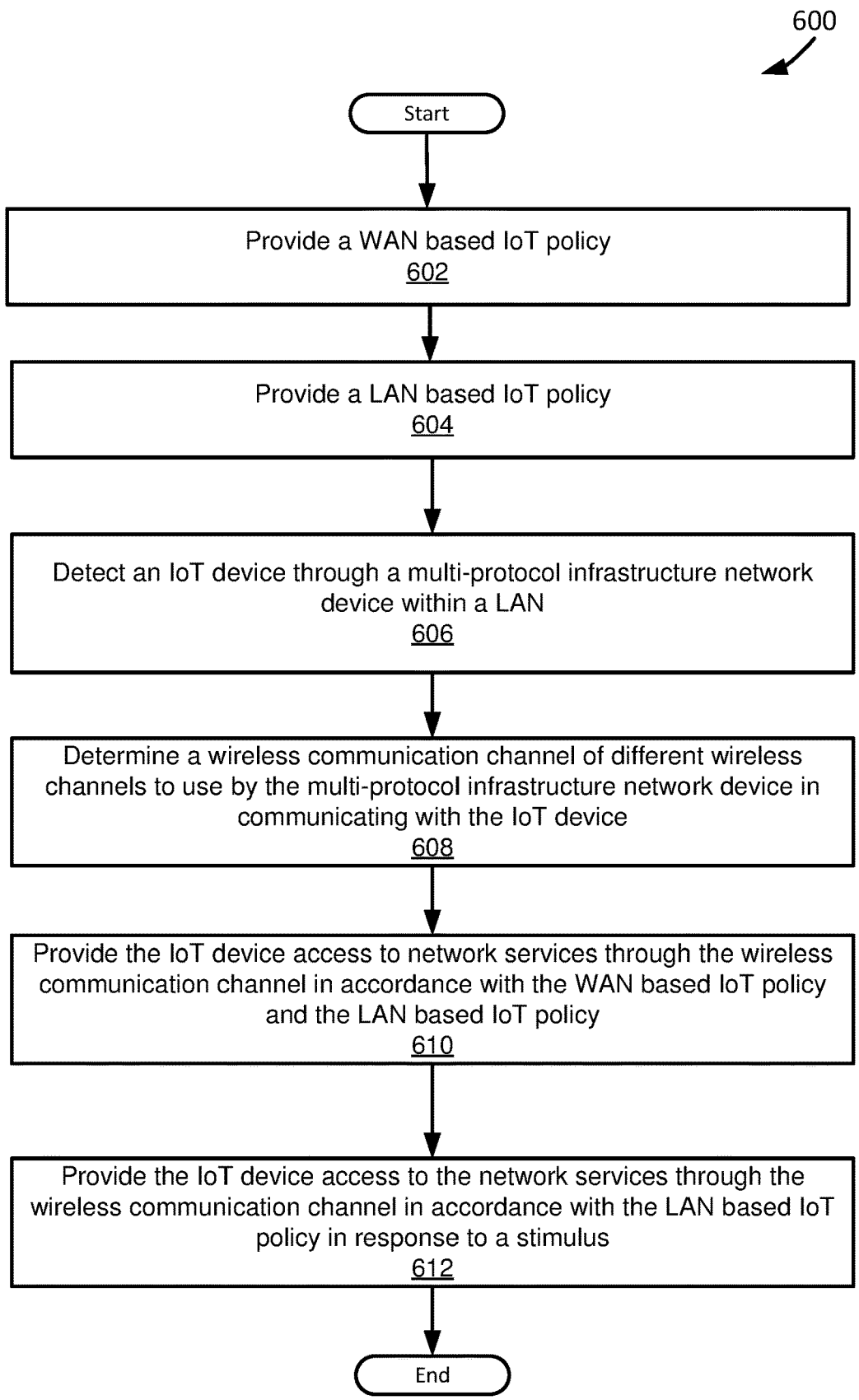
FIG. 6 depicts a flowchart of an example of a method for managing IoT devices through a multi-protocol infrastructure network device using IoT policies.

FIG. 6 depicts a flowchart 600 of an example of a method for managing IoT devices through a multi-protocol infrastructure network device using IoT policies. The flowchart 600 begins at module 602, where a WAN based IoT policy is provided. An applicable engine for providing a WAN based IoT policy, such as the WAN based IoT policy maintenance engines described in this paper, can provide a WAN based IoT policy. A WAN based IoT policy can be generated and or update as part of providing the WAN based IoT policy. A WAN based IoT policy can be provided in accordance with user input and/or traffic pattern records of IoT devices in accessing network services through a LAN. For example, a WAN based IoT policy can be provided based on packet inspection data generated by inspecting data packets sent to and from IoT devices in accessing network services through a LAN. Additionally, a WAN based IoT policy can be provided based on a LAN based IoT policy. For example, if a LAN based IoT policy is updated based on IoT device traffic pattern records, then a WAN based IoT policy can be updated based on changes made to the LAN based IoT policy.

The flowchart 600 continues to module 604, where a LAN based IoT policy is provided. An applicable engine for providing a LAN based IoT policy, such as the network device based IoT policy maintenance engines described in this paper, can provide a LAN based IoT policy. A LAN based IoT policy can be generated and or update as part of providing the LAN based IoT policy. A LAN based IoT policy can be provided in accordance with user input and/or traffic pattern records of IoT devices in accessing network services through a LAN. For example, a LAN based IoT policy can be provided based on packet inspection data generated by inspecting data packets sent to and from IoT devices in accessing network services through a LAN. Additionally, a LAN based IoT policy can be provided based on a WAN based IoT policy. For example, if a WAN based IoT policy is updated based on IoT device traffic pattern records, then a LAN based IoT policy can be updated based on changes made to the WAN based IoT policy.

The flowchart 600 continues to module 606, where an IoT device is detected through a multi-protocol infrastructure network device within a LAN. A multi-protocol infrastructure network device detecting an IoT device at module 606 can function according to the multi-protocol infrastructure network devices described in this paper. A multi-protocol infrastructure network device detecting an IoT device at module 606 is capable of communicating with IoT devices through different wireless communication channels established through different wireless communication protocols. For example, a multi-protocol infrastructure network device detecting an IoT device at module 606 can provide network service access to a first IoT device through a ZigBee® based WLAN and provide network service access to a second IoT device through a Wi-Fi based WLAN.

The flowchart 600 continues to module 608, where a wireless communication channel of different wireless communication channels to use by the multi-protocol infrastructure network in communicating with an IoT device is determined. The multi-protocol infrastructure network device is configured to determine a wireless communication channel from different wireless communication channels the network device is capable of communicating with IoT devices through. For example, if the multi-protocol infrastructure network device is capable of providing network service access to IoT devices through ZigBee® and Wi-Fi based WLANs, and an IoT device is configured to communicate through a ZigBee® WLAN, then the multi-protocol infrastructure network device can determine to use a ZigBee® based communication channel to communicate with the IoT device.

The flowchart 600 continues to module 610, where access to network services is provided to the IoT device through the wireless communication channel in accordance with the WAN based IoT policy and the LAN based IoT policy. An applicable engine or combination of applicable engines for controlling flow of data to and from IoT devices using multi-protocol infrastructure network devices, such as the WAN based IoT device data flow control engines and network device based IoT device data flow control engines described in this paper, can provide the IoT device access to network services through the wireless communication channel in accordance with the WAN based IoT policy and the LAN based IoT policy. In providing the IoT device access to network services through the wireless communication channel, the flow of data to and from the IoT device through the multi-protocol infrastructure network device can be controlled in accordance with the WAN based IoT policy and the LAN based IoT policy.

The flowchart 600 continues to module 612, where in response to a stimulus, the IoT device is provided access to network services through the wireless communication channel in accordance with the LAN based IoT policy. An applicable engine for locally controlling flow of data to and from IoT devices using multi-protocol infrastructure network devices, such as the network device based IoT device data flow control engines described in this paper, can provide the IoT device access to network services through the wireless communication channel in accordance with the LAN based IoT policy. A stimulus can include failure of a WAN through which the IoT device can access network services. In providing access to network services according to the LAN based IoT policy, data can be transmitted through a back-end of the LAN. Additionally, in providing access to network services according to the LAN based IoT policy, data can be transmitted through wireless connections directly connecting multi-protocol infrastructure network devices in the LAN to each other.

Figure 7:
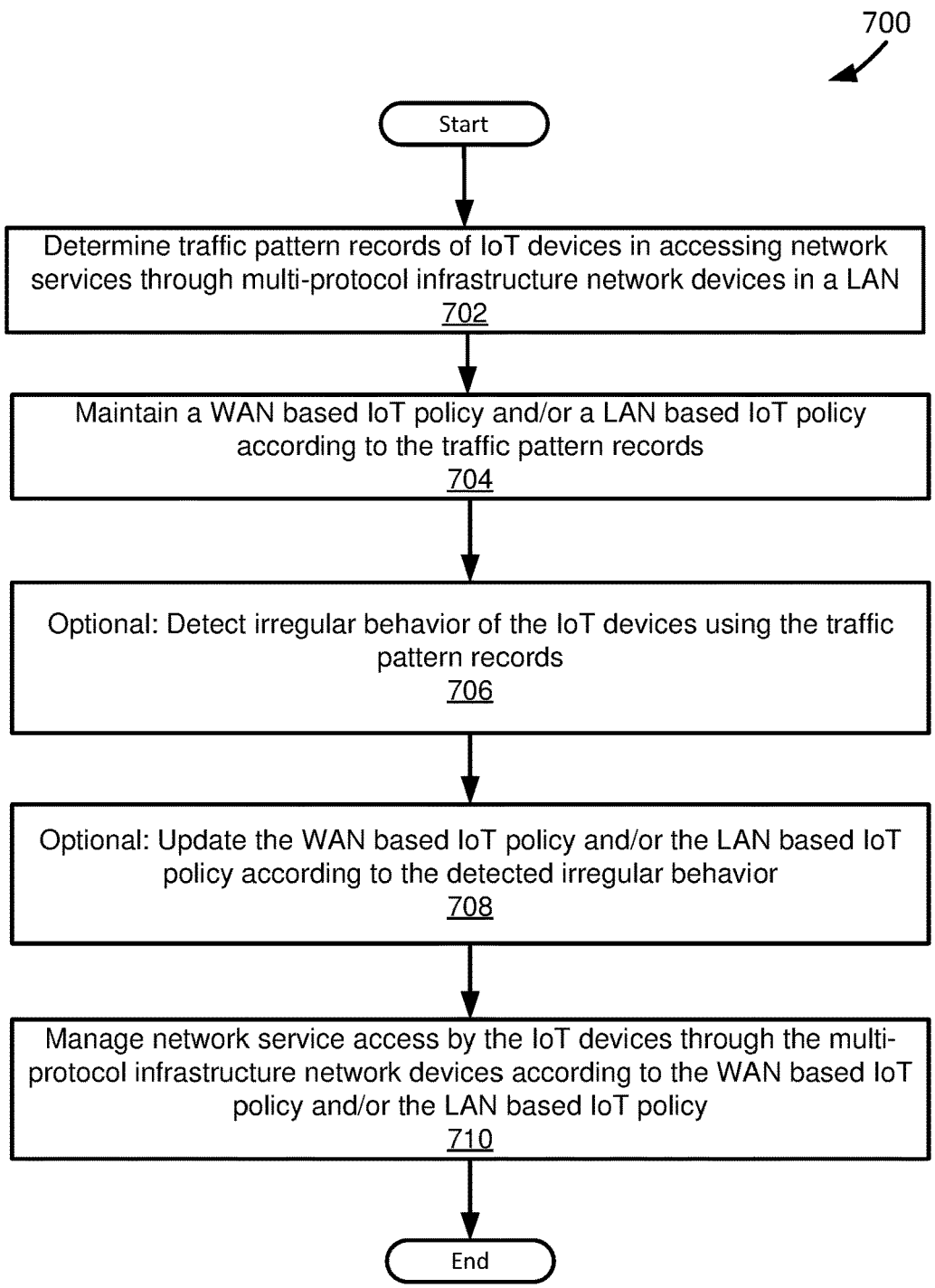
FIG. 7 depicts a flowchart of an example of maintaining either or both a WAN based IoT policy and a LAN based IoT policy for managing network service access of IoT devices through multi-protocol infrastructure network devices.

FIG. 7 depicts a flowchart 700 of an example of maintaining either or both a WAN based IoT policy and a LAN based IoT policy for managing network service access of IoT devices through multi-protocol infrastructure network devices. The flowchart 700 begins at module 702, where traffic pattern records of IoT devices accessing network services through multi-protocol infrastructure network devices in a LAN are determined. An applicable engine or combination of applicable engines for maintaining IoT device policies, such as the WAN based IoT traffic pattern tracking engines and network device based traffic pattern tracking engines described in this paper, can determine traffic patterns of IoT devices accessing network services through multi-protocol infrastructure network devices in a LAN. Traffic pattern records can be determined based on packet inspection data generate by analyzing packets sent to and from IoT devices. Additionally, traffic pattern data can be generated based on traffic pattern flows of data sent to and from IoT devices.

The flowchart 700 continues to module 704, where a WAN based IoT policy and/or a LAN based IoT policy is maintained according to the traffic pattern records. An applicable engine or combination of applicable engines for maintaining traffic pattern records of IoT devices, such as the WAN based IoT policy maintenance engines and the network device based IoT policy maintenance engines described in this paper, can maintain a WAN based IoT policy and/or a LAN based IoT policy according to the traffic pattern records. In maintaining a WAN based IoT policy and/or a LAN based IoT policy according to the traffic pattern records, the WAN based IoT policy and/or the LAN based IoT policy can be generated and/or updated according to the traffic pattern records. For example, if a traffic pattern record indicates a first IoT device consistently communicates with a second IoT device, then a WAN based IoT policy and/or a LAN based IoT policy can be updated to allow for the first and second IoT devices to communicate with each other.

The flowchart 700 continues to module 706, where optionally, irregular device behavior of the IoT devices is detected using the traffic pattern records. An applicable engine or combination of applicable engines for detecting irregular IoT device behavior, such as the WAN based IoT device irregular behavior detection engines and network device based IoT device irregular behavior detection engines described in this paper, can detect irregular behavior of the IoT devices using the traffic pattern records. For example, current traffic pattern records of the IoT devices, indicating current behavior of the IoT devices, can be compared to historical traffic pattern records of the IoT devices, indicating historical behavior of the IoT devices, to determine if the IoT devices are behaving irregularly.

The flowchart 700 continues to module 708, where optionally, the WAN based IoT policy and/or the LAN based IoT policy is updated based on the detected irregular behavior. An applicable engine or combination of applicable engines for maintaining IoT policies, such as the WAN based IoT policy maintenance engines and the network device based IoT policy maintenance engines described in this paper, can update the WAN based IoT policy and/or the LAN based IoT policy based on the detected irregular behavior. For example, an IoT policy can be updated to indicate blocking all data traffic to and form an IoT device exhibiting irregular behavior. In another example, an IoT policy can be updated to indicate blocking data traffic associated with irregular behavior an IoT device is exhibiting.

The flowchart 700 continues to module 710, where network service access by the IoT devices through the multi-protocol infrastructure network devices is managed according to the WAN based IoT policy and/or the LAN based IoT policy. An applicable engine or combination of applicable engines for controlling flow of data to and from IoT devices using multi-protocol infrastructure network devices, such as the WAN based IoT device data flow control engines and network device based IoT device data flow control engines described in this paper, can manage network service access by the IoT devices according to the WAN based IoT policy and/or the LAN based IoT policy.

Figure 8:
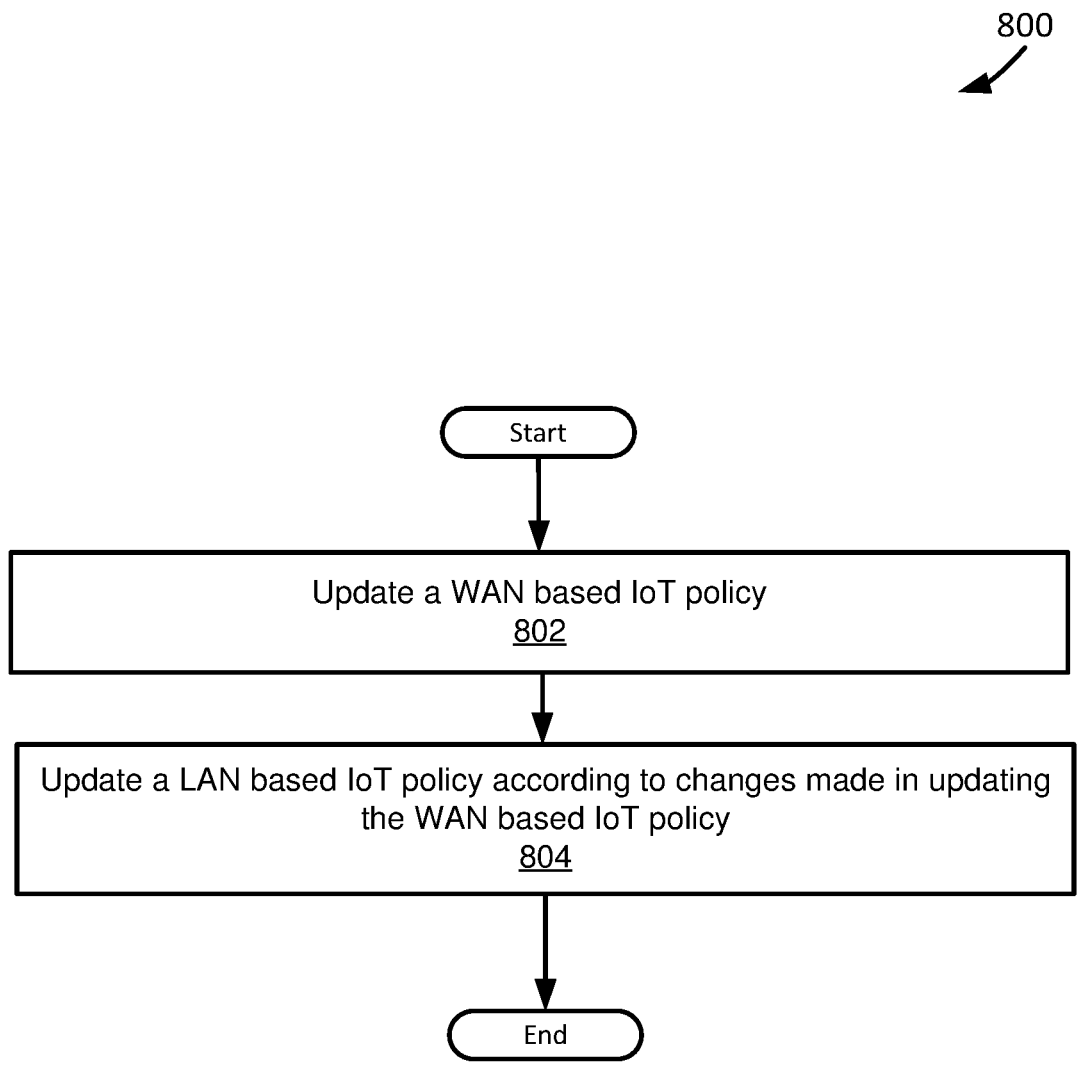
FIG. 8 depicts a flowchart of an example of a method for synchronizing a WAN based IoT policy with a LAN based IoT policy.

FIG. 8 depicts a flowchart 800 of an example of a method for synchronizing a WAN based IoT policy with a LAN based IoT policy. The flowchart 800 begins at module 802, where a WAN based IoT policy is updated. An applicable engine for managing a WAN based IoT policy, such as the WAN based IoT policy maintenance engines described in this paper, can update a WAN based IoT policy. A WAN based IoT policy can be updated based on one or a combination of user input, traffic pattern records of IoT devices, and detection of irregular IoT device behavior.

The flowchart 800 continues to module 804, where a LAN based IoT policy is updated according to changes made in updating the WAN based IoT policy. An applicable engine for managing a LAN based IoT policy, such as the network device based IoT policy maintenance engines described in this paper, can update a LAN based IoT policy based on changes made to the WAN based IoT policy. For example, if the WAN based IoT policy is updated to indicate instructing an IoT device to shut off at a specific time, then the LAN based IoT policy can be updated to indicate instructing the IoT device to shut off at the specific time.

Figure 9:
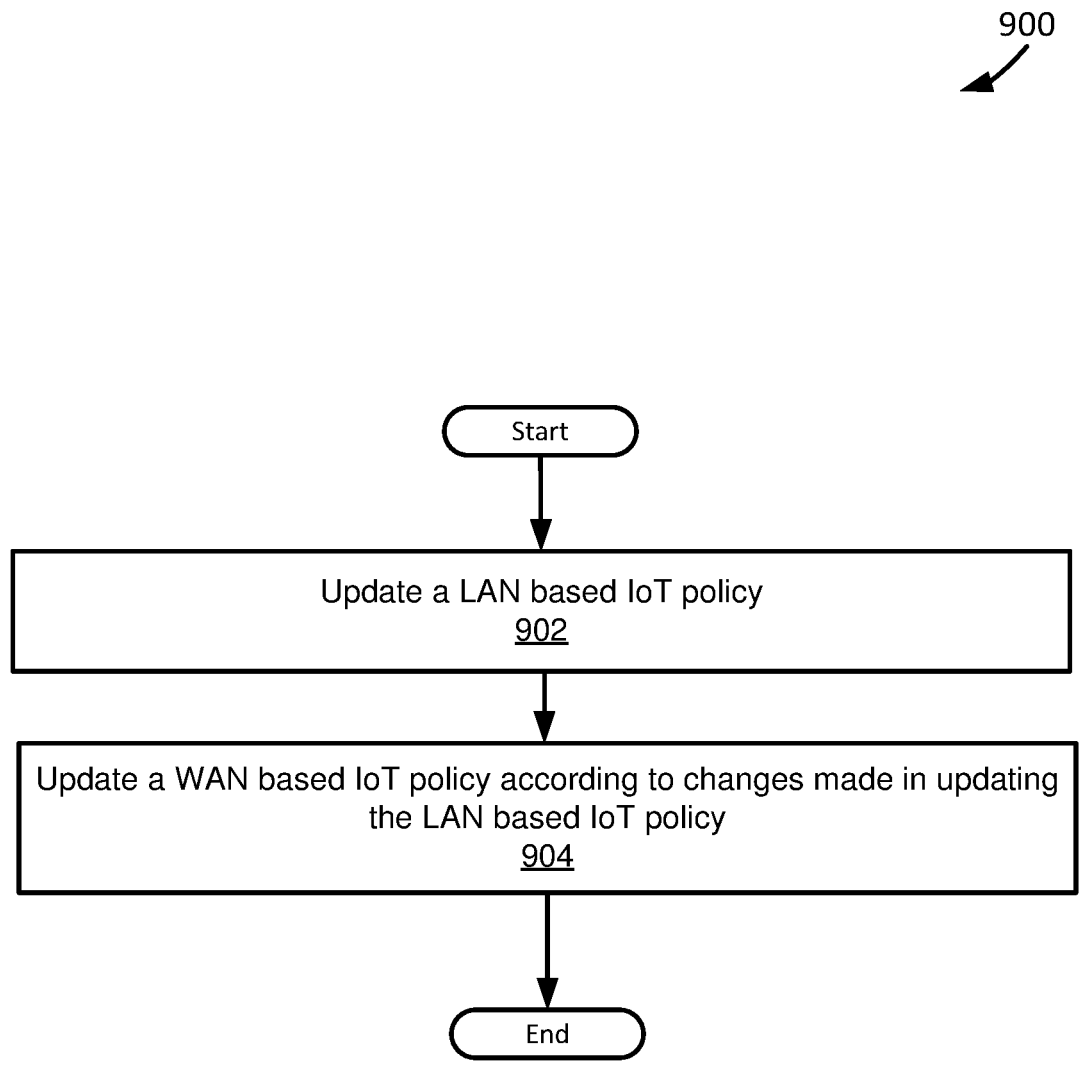
FIG. 9 depicts a flowchart of an example of a method for synchronizing a LAN based IoT policy with a WAN based IoT policy.

FIG. 9 depicts a flowchart 900 of an example of a method for synchronizing a LAN based IoT policy with a WAN based IoT policy. The flowchart 900 begins at module 902, where a LAN based IoT policy is updated. An applicable engine for managing a LAN based IoT policy, such as the network device based IoT policy maintenance engines described in this paper, can update a LAN based IoT policy. A LAN based IoT policy can be updated based on one or a combination of user input, traffic pattern records of IoT devices, and detection of irregular IoT device behavior. A LAN based IoT policy can be update in response to a stimulus. For example, a LAN based IoT policy can be updated when a WAN fails.

The flowchart 900 continues to module 904, where a WAN based IoT policy is updated according to changes made in updating the LAN based IoT policy. An applicable engine for managing a WAN based IoT policy, such as the WAN based IoT policy maintenance engines described in this paper, can update a WAN based IoT policy based on changes made to the LAN based IoT policy. For example, if the LAN based IoT policy is updated to indicate instructing an IoT device to shut off at a specific time, then the WAN based IoT policy can be updated to indicate instructing the IoT device to shut off at the specific time.

Figure 10:
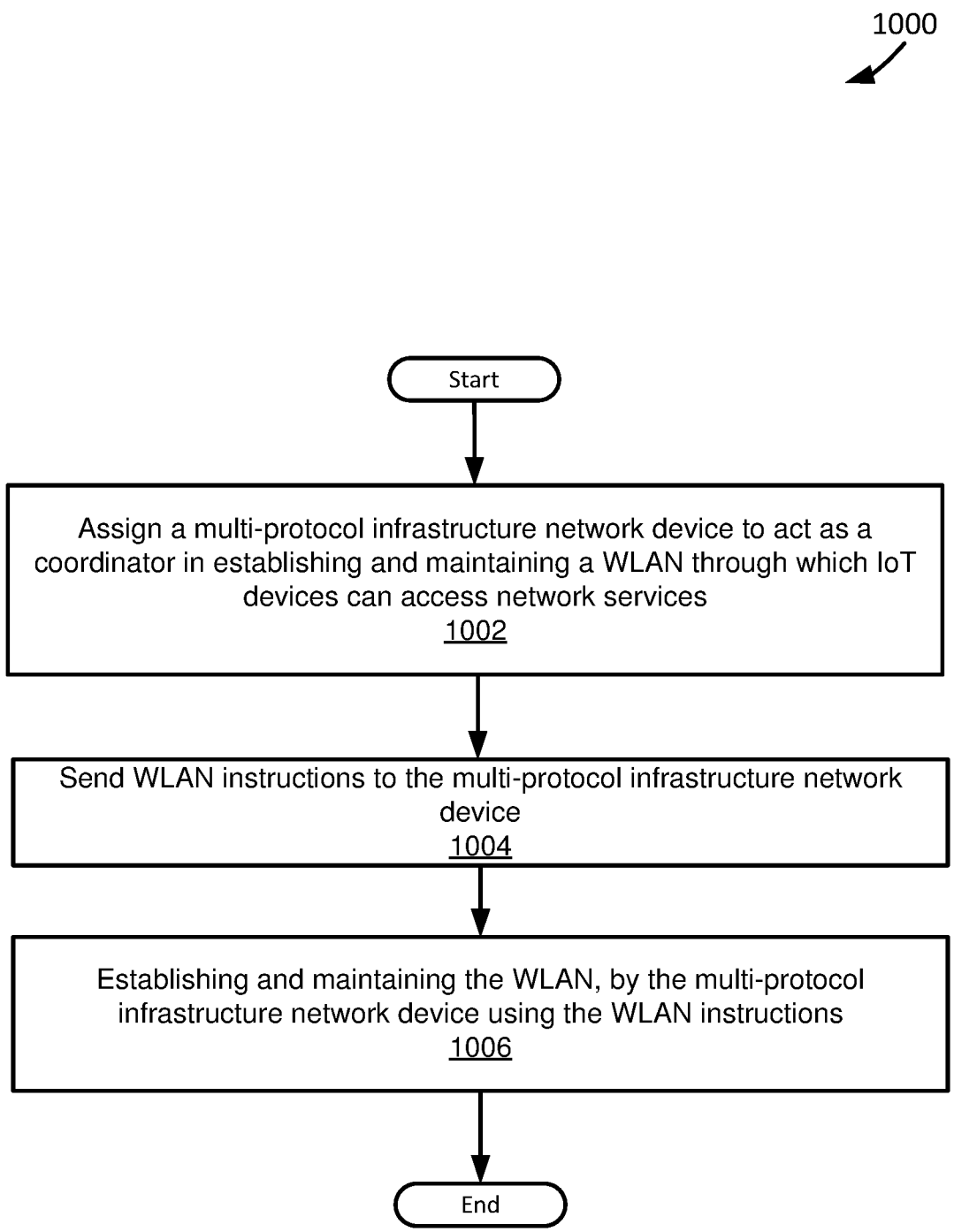
FIG. 10 depicts a flowchart of an example of a method for establishing WLANs using multi-protocol infrastructure network devices through which IoT devices can access network services.

FIG. 10 depicts a flowchart 1000 of an example of a method for establishing WLANs using multi-protocol infrastructure network devices through which IoT devices can access network services. The flowchart 1000 begins at module 1002, where a multi-protocol infrastructure network device is assigned to act as a coordinator in establishing and maintaining a WLAN through which IoT devices can access network services. An applicable engine for managing formation of WLANs, such as the WAN based WLAN formation engines described in this paper, can assign a multi-protocol infrastructure network device to act as a coordinator in establishing and maintaining a WLAN. A multi-protocol infrastructure network device can be selected to act as a coordinator in establishing and maintaining a WLAN if it is capable of communicating through the WLAN. For example, a multi-protocol infrastructure network device can be selected to act as a coordinator for a ZigBee® network if it includes necessary hardware used in communicating according to the ZigBee® protocol.

The flowchart 1000 continues to module 1004, where WLAN instructions are sent to the multi-protocol infrastructure network device. An applicable engine for managing formation of WLANs, such as the WAN based WLAN formation engines described in this paper, can send WLAN instructions to the multi-protocol infrastructure network device assigned to act as a coordinator for the WLAN. WLAN instructions sent to the multi-protocol infrastructure network device can include instructions for establishing and maintaining the WLAN.

The flowchart 1000 continues to module 1006, where the multi-protocol infrastructure network device establishes and maintains the WLAN using WLAN instructions. For example, the multi-protocol infrastructure network device can select a frequency band and a communication channel within the frequency band to communicate over in establishing and maintaining the WLAN.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method, comprising:
    detecting an Internet of Things (IoT) device through a multi-protocol infrastructure network device configured for wireless communication with IoT devices through a plurality of wireless channels having a respective plurality of wireless communication protocols;
    determining a wireless channel of the plurality of wireless channels to use in communicating with the IoT device;
    providing the IoT device access to network services through the wireless channel, the network services being provided in accordance with a Wide Area Network (WAN) based IoT policy to provide access through a WAN and in accordance with a Local Area Network (LAN) based IoT policy to prohibit access through the WAN; and
    in response to a stimulus, terminating the access to the network services by the IoT device through the WAN in accordance with the WAN based IoT policy and maintaining the access to the network services by the IoT device through the wireless channel in accordance with the LAN based IoT policy,
    wherein the WAN based IoT policy is updated according to traffic pattern records of IoT devices accessing the network services through the WAN, and
    wherein the LAN based IoT policy is updated according to traffic pattern records of IoT devices wirelessly connected to the multi-protocol infrastructure network device through the LAN.

2. The method of claim 1, wherein the stimulus includes a WAN connection failure.

3. The method of claim 1, wherein maintaining the access to network services by the IOT device through the wireless channel in accordance with the LAN based IoT policy includes transmitting data between other multi-protocol infrastructure network devices using a LAN back-end.

4. The method of claim 1, wherein the multi-protocol infrastructure network device comprises a first multi-protocol infrastructure network device, the method further comprising exchanging, via a wireless network, data between the first multi-protocol infrastructure network device and a second multi-protocol infrastructure network device directly interconnected with the first multi-protocol infrastructure network device.

5. The method of claim 1, wherein the multi-protocol infrastructure network device serves as a portal to a LAN back-end by being connected to the LAN back-end.

6. The method of claim 1, wherein the IoT device is a first IoT device and the wireless channel is a first wireless channel, the method further comprising:
    detecting a second IoT device through the multi-protocol infrastructure network device;
    determining a second wireless channel of the plurality of wireless channels to use in communicating with the second IoT device;
    providing the second IoT device access to second network services through the second wireless channel, the second network services being provided in accordance with the WAN based IoT policy to provide access through a WAN and in accordance with the LAN based IoT policy to prohibit access through the WAN; and
    in response to the stimulus, terminating the access to the second network services by the second IoT device through the WAN in accordance with the WAN based IoT policy and maintaining the access to the second network services by the second IoT device through the second wireless channel in accordance with the LAN based IoT policy.

7. The method of claim 1, further comprising:
    modifying the LAN based IoT policy according to traffic pattern records detected by one or more multi-protocol infrastructure network devices including the multi-protocol infrastructure network device; and
    updating the WAN based IoT policy according to modifications made to the LAN based IoT policy based on the traffic pattern records.

8. The method of claim 1, further comprising:
    receiving packet inspection data generated by inspecting data packets transmitted to and from IoT devices accessing the network services through one or more multi-protocol infrastructure network devices including the multi-protocol infrastructure network device;
    determining traffic pattern records of the IoT devices accessing the network services using the packet inspection data; and
    updating the WAN based IoT policy according to the traffic pattern records.

9. The method of claim 1, further comprising:
    receiving packet inspection data generated by inspecting data packets transmitted to and from IoT devices accessing the network services through one or more multi-protocol infrastructure network devices including the multi-protocol infrastructure network device;
    determining traffic pattern records of the IoT devices accessing the network services using the packet inspection data; and
    updating the LAN based IoT policy according to the traffic pattern records.

10. The method of claim 1, further comprising:
    receiving packet inspection data generated by inspecting data packets transmitted to and from IoT devices accessing the network services through one or more multi-protocol infrastructure network devices including the multi-protocol infrastructure network device;
    determining traffic pattern records of the IoT devices accessing the network services using the packet inspection data;
    detecting anomalous IoT device behavior using the traffic pattern records; and
    updating the WAN based IoT policy using the anomalous IoT device behavior.

11. A system, comprising:
    a Wide Area Network ("WAN") based Internet of Things ("IoT") policy maintenance engine configured to maintain a WAN based IoT policy at an IoT device management system;
    a network device based IoT policy maintenance engine configured to maintain a Local Area Network ("LAN") based IoT policy;

a multi-protocol infrastructure network device configured to:
  detect an IoT device through a multi-protocol infrastructure network device configured for wireless communication with IoT devices through a plurality of wireless channels having a respective plurality of wireless communication protocols;
  determine a wireless channel of the plurality of wireless channels to use in communicating with the IoT device;
a network device based IoT device data flow control engine configured to:
  provide the IoT device access to network services through the wireless channel, the network services being provided in accordance with a Wide Area Network (WAN) based IoT policy to provide access through a WAN and in accordance with a Local Area Network (LANA based IoT policy to prohibit access through the WAN; and
  in response to a stimulus, terminating the access to the network services by the IoT device through the WAN in accordance with the WAN based IoT policy and maintain the access to the network services by the IoT device through the wireless channel in accordance with the LAN based IoT policy,
  wherein the WAN based IoT policy is updated according to traffic pattern records of IoT devices accessing the network services through the WAN, and
  wherein the LAN based IoT policy is updated according to traffic pattern records of IoT devices wirelessly connected to the multi-protocol infrastructure network device through the LAN.

12. The system of claim 11, wherein the stimulus includes a WAN connection failure.

13. The system of claim 11, wherein the network device based IoT device data flow control engine is further configured to control transmission of data between other multi-protocol infrastructure network devices within the LAN using a back-end of the LAN.

14. The system of claim 11, wherein the multi-protocol infrastructure network device is a first multi-protocol infrastructure network device, and wherein the network device based IoT device data flow control engine is further configured to control exchanging, via a wireless network, data between the first multi-protocol infrastructure network device and a second multi-protocol infrastructure network device directly interconnected with the first multi-protocol infrastructure network device.

15. The system of claim 11, wherein the multi-protocol infrastructure network device serves as a direct portal to a back-end of the LAN by being directly connected to the back-end.

16. The system of claim 11, wherein:
  the multi-protocol infrastructure network device is further configured to:
    detect a second IoT device; and
    determine a second wireless channel of the plurality of wireless channels to use in communicating with the second IoT device; and
  the network device based IoT device data flow control engine is further configured to:
    provide the second IoT device access to second network services through the second wireless channel, the second network services being provided in accordance with the WAN based IoT policy to provide access through a WAN and in accordance with the LAN based IoT policy to prohibit access through the WAN; and
    in response to the stimulus, terminate the access to the second network services by the second IoT device through the WAN in accordance with the WAN based IoT policy and maintain the access to the second network services by the second IoT device through the second wireless channel in accordance with the LAN based IoT policy.

17. The system of claim 11, further comprising:
the network device based IoT policy maintenance engine is further configured to modify the LAN based IoT policy according to traffic pattern records of IoT devices; and
a WAN based IoT policy maintenance engine is further configured to update the WAN based IoT policy according to modifications made to the LAN based IoT policy.

18. The system of claim 11, further comprising:
a WAN based IoT traffic pattern tracking engine configured to:
  receive packet inspection data generated by inspecting data packets transmitted to and from IoT devices accessing the network services through one or more multi-protocol infrastructure network devices including the multi-protocol infrastructure network device;
  determine traffic pattern records of the IoT devices accessing the network services using the packet inspection data; and
a WAN based IoT policy maintenance engine configured to update the WAN based IoT policy according to the traffic pattern records.

19. The system of claim 11, further comprising:
a LAN based IoT traffic pattern tracking engine configured to:
  receive packet inspection data generated by inspecting data packets transmitted to and from IoT devices accessing the network services through one or more multi-protocol infrastructure network devices including the multi-protocol infrastructure network device; and
  determine traffic pattern records of the IoT devices accessing the network services using the packet inspection data; and
a LAN based IoT policy maintenance engine configured to update the LAN based IoT policy according to the traffic pattern records.

20. A non-transitory, tangible computer-readable device having instructions stored thereon that, when executed by at least one computing device, causes the at least one computing device to perform operations comprising:
  detecting an Internet of Things (IoT) device through a multi-protocol infrastructure network device configured for wireless communication with IoT devices through a plurality of wireless channels having a respective plurality of wireless communication protocols;
  determining a wireless channel of the plurality of wireless channels to use in communicating with the IoT device;
  providing the IoT device access to network services through the wireless channel, the network services being provided in accordance with a Wide Area Network (WAND based IoT policy to provide access through a WAN and in accordance with a Local Area Network (LANA based IoT policy to prohibit access through the WAN;

terminating the access to the network services by the IoT device through the WAN in accordance with the WAN based IoT policy in response to a stimulus;

maintaining the access to the network services by the IoT device through the wireless channel in accordance with the LAN based IoT policy in response to the stimulus, wherein the WAN based IoT policy is updated according to traffic pattern records of IoT devices accessing the network services through the WAN, and wherein the LAN based IoT policy is updated according to traffic pattern records of IoT devices wirelessly connected to the multi-protocol infrastructure network device through the LAN.

\* \* \* \* \*